United States Patent [19]
Blanc et al.

[11] Patent Number: 5,465,345
[45] Date of Patent: Nov. 7, 1995

[54] PARALLEL PROCESSING OF RECEIVED AND TRANSMITTED BIT STREAM IN TELECOMMUNICATIONS EQUIPMENT INCLUDING A DSP AND SUPPORTING HDLC/SDLC PROTOCOLS

[75] Inventors: Alain Blanc; Lucien Ceresiani, both of Vence, France

[73] Assignee: International Business Machines Corporation, Armonk, N.Y.

[21] Appl. No.: 947,601

[22] Filed: Sep. 21, 1992

[30] Foreign Application Priority Data

Nov. 29, 1991 [EP] European Pat. Off. ............... 91480174

[51] Int. Cl.$^6$ ............................... G06F 3/00; G06F 15/16
[52] U.S. Cl. .................... 395/200.15; 364/284.4; 364/284.3; 364/260.9; 364/240.8; 364/DIG. 1; 395/200.06; 370/60.1
[58] Field of Search ........................ 395/800, 200, 395/500

[56] References Cited

U.S. PATENT DOCUMENTS

| | | | |
|---|---|---|---|
| 4,991,169 | 2/1991 | Davis | 370/77 |
| 5,119,478 | 6/1992 | Calvignac | 395/200 |
| 5,218,680 | 6/1993 | Farrell | 395/327 |

FOREIGN PATENT DOCUMENTS

| | | | |
|---|---|---|---|
| 0323222 | 7/1989 | European Pat. Off. | H04L 11/00 |
| 0346555 | 12/1989 | European Pat. Off. | H04L 11/00 |

Primary Examiner—Eric Coleman
Attorney, Agent, or Firm—John J. Timar; Edward H. Duffield

[57] ABSTRACT

Parallel processing method in a telecommunication equipment including a Digital Signal Processing system (202) associated with some RAM storage. The telecommunication equipment receives bit streams transporting HDLC/SDLC frames. For receiving bit streams the method involves the steps of building at least one table providing the '0' deletion and character alignment functions required in the HDLC/SDLC management procedures, receiving the incoming bit stream and assembling samples of n consecutive bits therefrom to be processed in parallel, and using said assembled n consecutive bits as addressing elements for accessing said at least one table in order to derive a character corresponding to data to be extracted from the HDLC frame. For transmitting bit streams, the method elaborates the transmitted HDLC bit streams by building at least one table (5, 45, 48) providing the '0' insert and character alignment functions required in the HDLC/SDLC management procedures, extracting the characters to transmit to the HDLC line and assembling n consecutive bits therefrom to be processed in parallel, and using said assembled n consecutive bits as addressing elements for accessing said at least one table in order to derive the character corresponding to the HDLC bit stream to be transmitted.

5 Claims, 17 Drawing Sheets

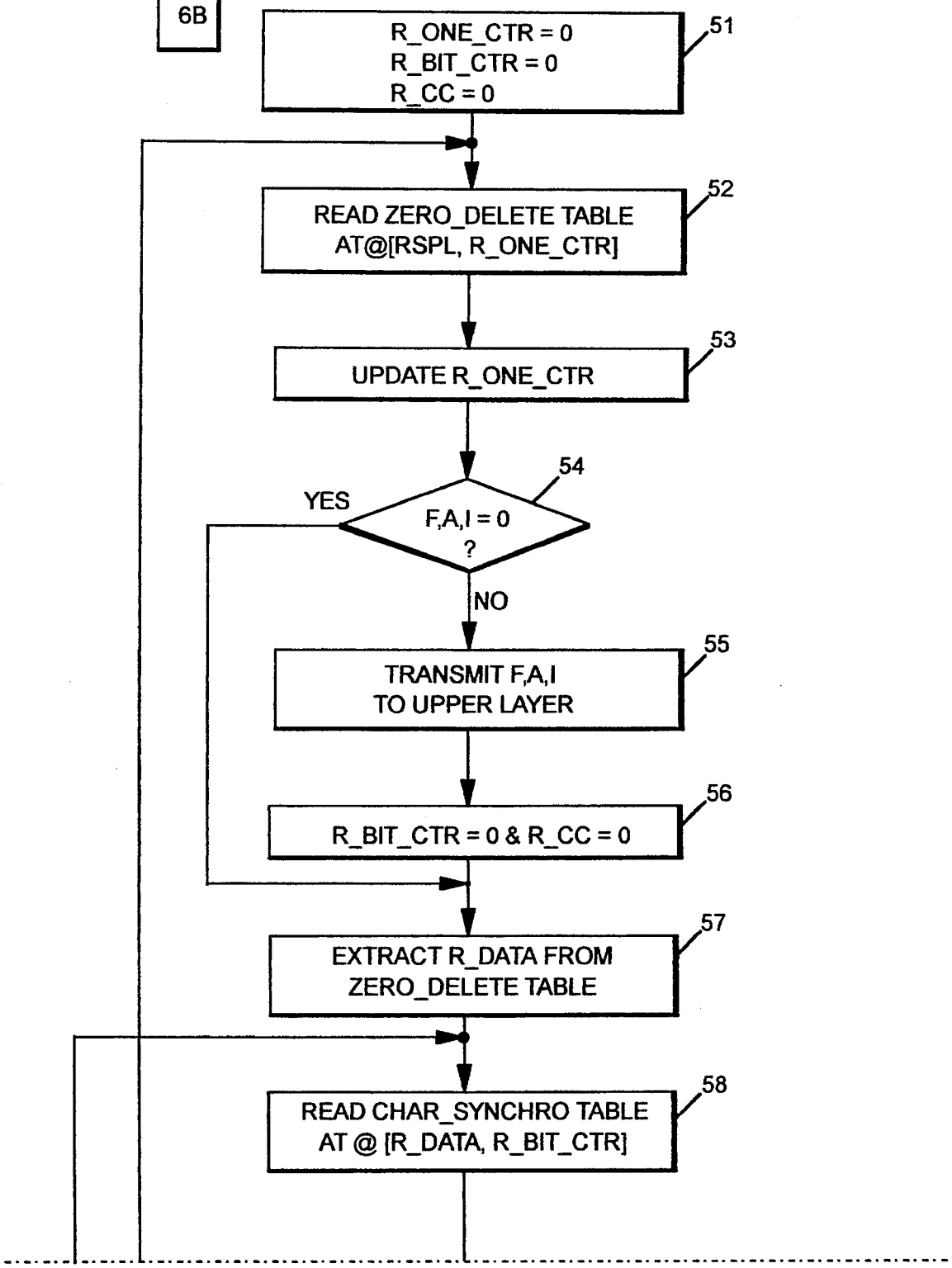

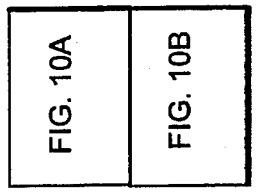
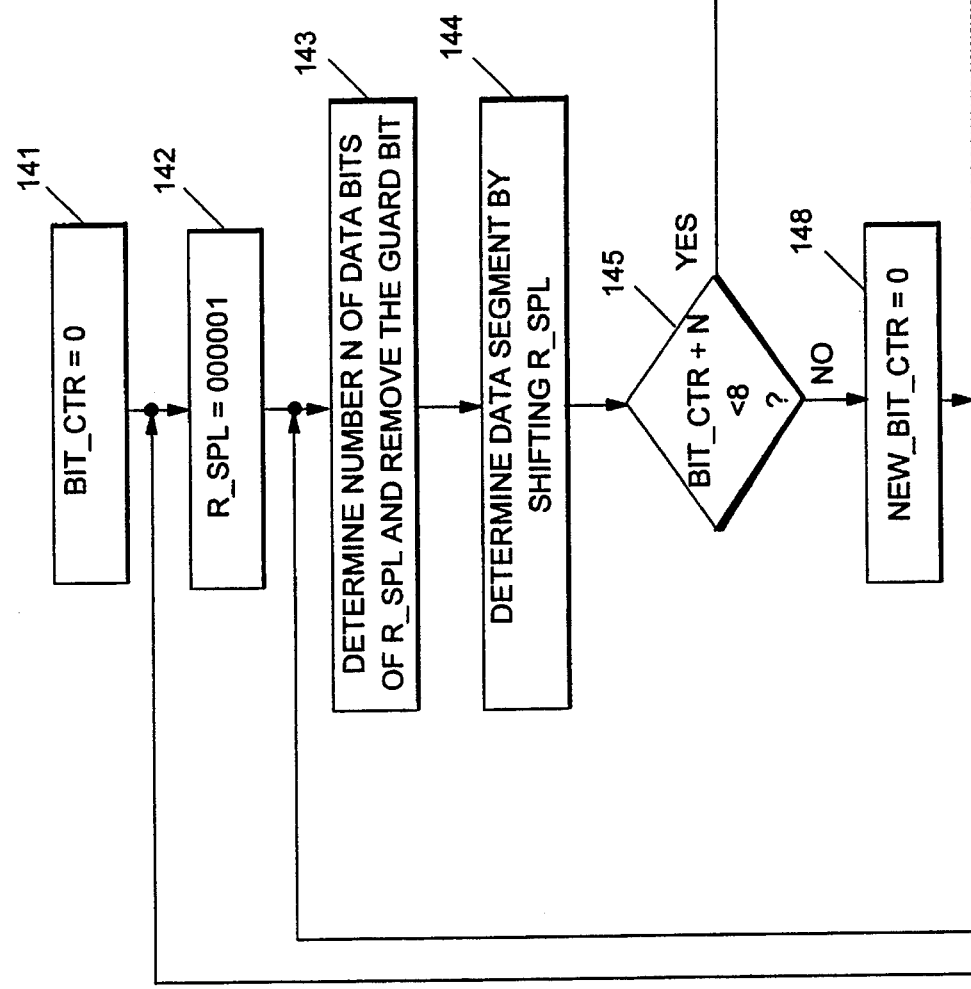

PARALLEL PROCESSING OF RECEIVED AND TRANSMITTED BIT STREAM IN TELECOMMUNICATIONS EQUIPMENT INCLUDING A DSP AND SUPPORTING HDLC/SDLC PROTOCOLS

TECHNICAL FIELD OF INVENTION

The invention relates generally to telecommunication equipment and particularly to a parallel processing method for use in telecommunication equipment including a Digital Signal Processor (DSP) for receiving and transmitting HDLC/SDLC bit streams.

BACKGROUND ART

The progress of technology provides the possibility of using powerful Digital Signal Processors (DSP) in modern telecommunication equipments. Particularly, such processors permit the design of DCE's and modems which allow multiple operating configurations. European Patent application number 91480025 entitled "DCE and Method for Processing Data Received in a DCE Allowing Multiple Operating Configurations", having a priority date of Feb. 21, 1991, and assigned to the assignee of the present application is incorporated by reference in this application. This document discloses the combination of a DSP performing the signal processing and a control processor which is used for handling the protocols. In such a DCE, the analog signal which is received from the telecommunication line is converted by means of an A/D converter, such as a sigma-delta coder, for instance. The DSP processes the train of sigma-delta pulses and derives a sequence of Pulse Coded Modulation (PCM) words. PCM words are then digitally processed in accordance with a given demodulation algorithm and the DSP derives the train of data bits which has been transmitted on the telecommunication line. For this train of bits, the DSP has to derive the corresponding characters in accordance with the considered transmission protocol. In case of High Data Link Control (HDLC) or SDLC procedures, it is required to provide the flag detection, the zero delete functions, etc . . . , well known in the telecommunication field.

Specialized components, known as HDLC or SDLC adapters, provide management of HDLC procedures. These specialized components entail some drawbacks. First they use a serial architecture and are required to operate at the bit clock rate. This obviously results in the system being limited to the speed of the serial logic technology. Secondly, since they operate on a serial train of bits, they appear to be not adapted to the architecture such as described in the above mentioned document. In such an architecture, the sigma-delta pulses are directly stored in RAM storage associated with the DSP. Signal processing is then performed on a parallel basis and the DSP computes the train of bits which is also stored in RAM. It therefore appears that the serial train of bits has no physical counterpart in the DCE and that the use of a traditional serial HDLC adapter would require the artificial generation of the train of data bits. Such generation would inevitably entail an increase in the complexity and the final cost of the DCE. Thirdly, the known HDLC adapters cannot be easily multiplexed and it is necessary to use as many adapters as there are telecommunication lines.

The possibility of performing parallel processing of the bits in order to provide HDLC procedure management functions has already been contemplated, particularly in EP application 0 346 555 entitled "Parallel Processing Method and Device for Receiving and Transmitting HDLC/SDLC Bit Streams", and IBM Technical Disclosure Bulletin vol. 32, no. 6B, November 1989, page 31, "Parallel Architecture for High Speed Bit Stuffing and Byte Alignment". The solutions which are described in the above two documents have the drawback of requiring a great number of hardware components and are not well adapted for multiplexed telecommunication lines.

OBJECTS OF THE INVENTION

The object of by the present invention is to provide an HDLC/SDLC protocol adaptation method and apparatus which can be easily used on multiplexed lines and in an architecture in which most functions are provided by means of digital signal processing operations.

BRIEF SUMMARY OF THE INVENTION

This object is achieved by the method of the present invention. It involves a step of building at least one table providing the '0' delete/insert function and character alignment required in the HDLC/SDLC management procedures. The incoming bit stream is received and used for assembling samples of n (where n is an arbitrary integer number) consecutive bits therefrom to be parallelly processed. The method then uses the assembled n consecutive bits as addressing elements for accessing at least one table in order to derive a character which corresponds to data to be extracted from the HDLC frame for the receive process, or which corresponds to the HDLC bit stream for the transmission process. This allows parallel processing of the n consecutive bits and thus allows the processing of high speed HDLC lines. Moreover, since the tables can be used for managing numerous HDLC/SDLC lines, multiplexing is easily provided and at a low cost. This parallel processing method is also well adapted to a DSP architecture in which the analog signal received by the line interface circuit is directly converted into sigma-delta pulses and then into PCM words. In such an architecture, the method according to the present invention allows the elaboration of the HDLC frames directly in the RAM and does not need additional hardware components operating at the bit clock rate.

In a preferred embodiment of the invention, the above tables are stored into a PROM or ROM storage within the machines and are transferred into the RAM storage associated with the DSP during an initialization procedure. This results in the possibility of using an ordinary PROM or ROM storage which is associated with the control processor handling the protocol which generally exists in the equipment. Therefore, there is no need for a fast PROM storage, i.e. having short access time, for storing the tables.

Preferably, the tables are generated by a software program which is also stored in the PROM storage associated with the control processor. The software program is transferred during the initialization procedure used in the fast RAM storage which is associated with the DSP in order to generate the above tables. At the completion of the table generation process, the software program is erased from the RAM in order to release the corresponding RAM storage locations. This allows minimizing the size of RAM storage required.

In a preferred embodiment of the invention, the receive process of the method involves a ZERO-DELETE table while the transmit process uses a ZERO-INSERT table. Both Receive and Transmit processes also share a unique CHAR- SYNCHRO table which provides for character alignment functions.

BRIEF DESCRIPTION OF THE DRAWINGS

FIGS. 6a and 6b illustrate the receive process of the parallel processing method according to the second embodiment of the invention.

DETAILED DESCRIPTION OF PREFERRED EMBODIMENT OF THE INVENTION

Figure 1:
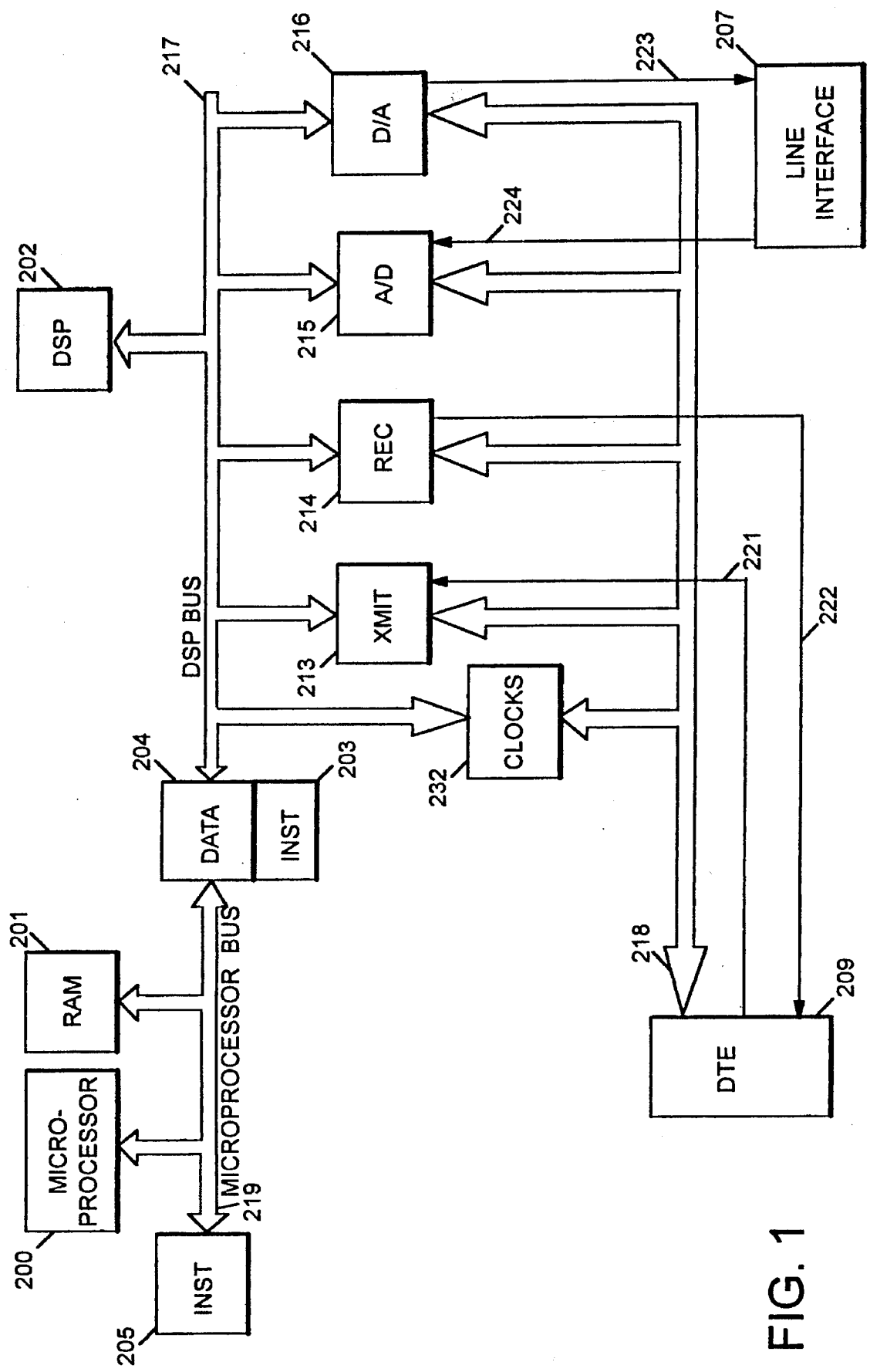
FIG. 1 describes the general architecture of a DCE using a DSP and a control processor in which is incorporated the parallel processing method according to the present invention.

FIG. 1 illustrates the architecture of a multiple purpose DCE based on a digital signal processor (DSP) which incorporates the present invention. The DCE includes a general purpose microprocessor 200 for controlling the protocols. It is connected to a PROM storage 205 and to a RAM storage 201 via a bus 219. A Digital Signal Processor (DSP) 202 is connected to another RAM storage having a first data field 204 and a second instruction field 203 via a bus 217. DSP 202 is used for carrying out real time signal processing operations as well as bit flow control operations. The RAM storage 203/204 is also connected to bus 219 which provides a logical connection between the two processors 200 and 202. It should be noticed that, in actual practice the RAM with contents 203/204 is a combination of a common RAM storage and well known Direct Memory Access means. A clock generator 232 provides, on a clock bus 218, all the needed clocks in the DCE, and particularly an internal clock which is derived from an internal (not shown) oscillator, the receive clock which is derived from the receive signal, and the external clock which is provided at the DTE interface. A Transmit (Xmit) block 213 deserializes the transmit data bits coming from lead 221 at the DTE V24 interface, for instance. When an n-bit packet is assembled, an interrupt for DSP processor 202 is generated to indicate the latter that the n-bit packet can be read. Xmit block 213 is under control of the transmit clock provided on clock bus 218 (either the internal, or external clock or receive clock in accordance with the desired configuration).

A Receive block REC 214 generates interrupt signals to DSP 202 when it is to receive n-bit-words from DSP processor 202 on bus 217. The Receive block 214 serializes, on lead 222, the n-bit-word at the rate of the receive clock which exists on the clock bus 218.

A digital-to-analog converter D/A 216 receives the samples which have been computed by DSP processor 202 in accordance with the modulation algorithm, the latter modulation algorithm being pulsed at the rate of the Xmit sampling clock which is also provided by clock generator 232 on clock bus 218.

Similarly, an analog-to-digital converter A/D 215 provides DSP processor 202 with samples at the rate of the receive sampling clock which is also generated by clock generator 232 on clock bus 218. In the preferred embodiment of the invention, D/A 216 and A/D 215 are respectively a sigma-delta decoder and coder. Finally, a line interface circuit 207 is connected to A/D circuit 215 via a lead 224 and to the D/A circuit 216 via lead 223 which performs the appropriate coupling to the telecommunication line.

Effective timing arrangement circuits for controlling Xmit block 212, receive block 214, analog-to-digital circuit 215 and digital-to-analog circuit 216 are disclosed in EP-A-90480150.3 and its counterpart U.S. Pat. No. 5,135,622 entitled "Data Circuit Terminating Equipment (DCE) including Timing Arrangement circuits controlled by processing means" and assigned to the assignee of the present application and incorporated herein by reference.

Briefly, in accordance with the description of EP A-90480150.3, the control of those circuits is achieved by storing a number of digital values in appropriate registers: Receive Sampling (RS) time register (43), Transmit sampling (XS) time register (53), a Transmit Data (TD) register (33) and Receive Data (RD) time register (23). The content of every register is continuously compared to the content of a timer (60). Whenever the timer reaches the value stored in one register, RS time register (43) for instance, analog-to-digital converter 215 performs a sampling of the analog signal appearing on lead 224. By programming the value stored in RS time register , DSP processor 202 can control the sampling transmit clock which pulses A/D circuit 215. More generally, by programming the appropriate digital values in each of said registers, the DSP processor 202 can accurately control and adjust any clock which is used in the DCE without necessitating use of a large number of clock dividers and electronic switches. Similarly, the DSP processor 202 can accurately control the digital-to-analog conversion of a n-bit-word at the appropriate Xmit sampling clock by generating an appropriate sequence of digital values in the XS time register associated with D/A circuit 216. It should, however, be noticed that traditional clock control or timing arrangement circuits can be used for embodying the method according to the present invention.

Therefore, the RAM storage associated with the DSP, and particularly the data field 204, is loaded with packets of bits which come either from the line interface circuit 207 (via A/D block 215 and after the appropriate demodulation digital processing algorithm) or the DTE 213. Those packets of bits which are stored in the RAM correspond to a stream of data bits transporting a HDLC frame that must be processed in order to provide the known HDLC functions, that is to say the flag detection, the idle/abort management, the zero delete and the extraction of characters.

In a first embodiment of the invention, RAM storage

203/204, and particularly the INSTRUCTION field 203, is loaded with two distinctive tables which are used for performing the parallel processing method according to the present invention. The loading of the two tables into the RAM storage is performed during an initialization procedure occurring after the power-on of the machine.

Figure 2A:
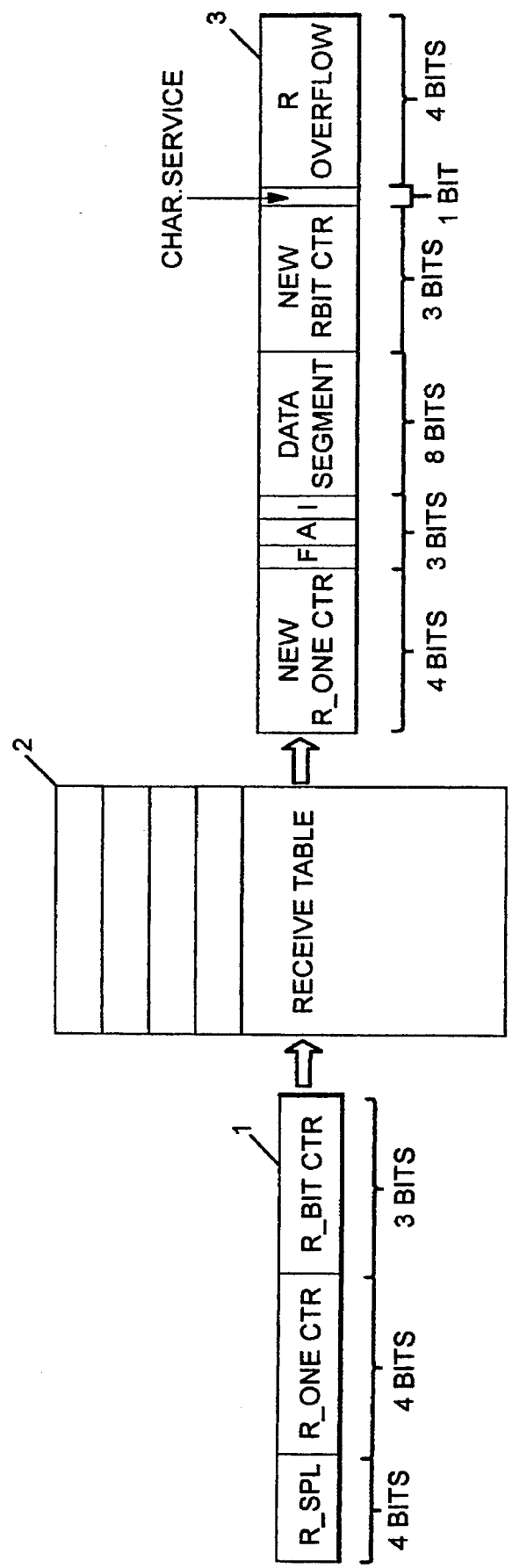
FIGS. 2a and 2b, respectively, illustrate the format of the receive and transmit tables which are used in a first embodiment of the invention.
Figure 2B:
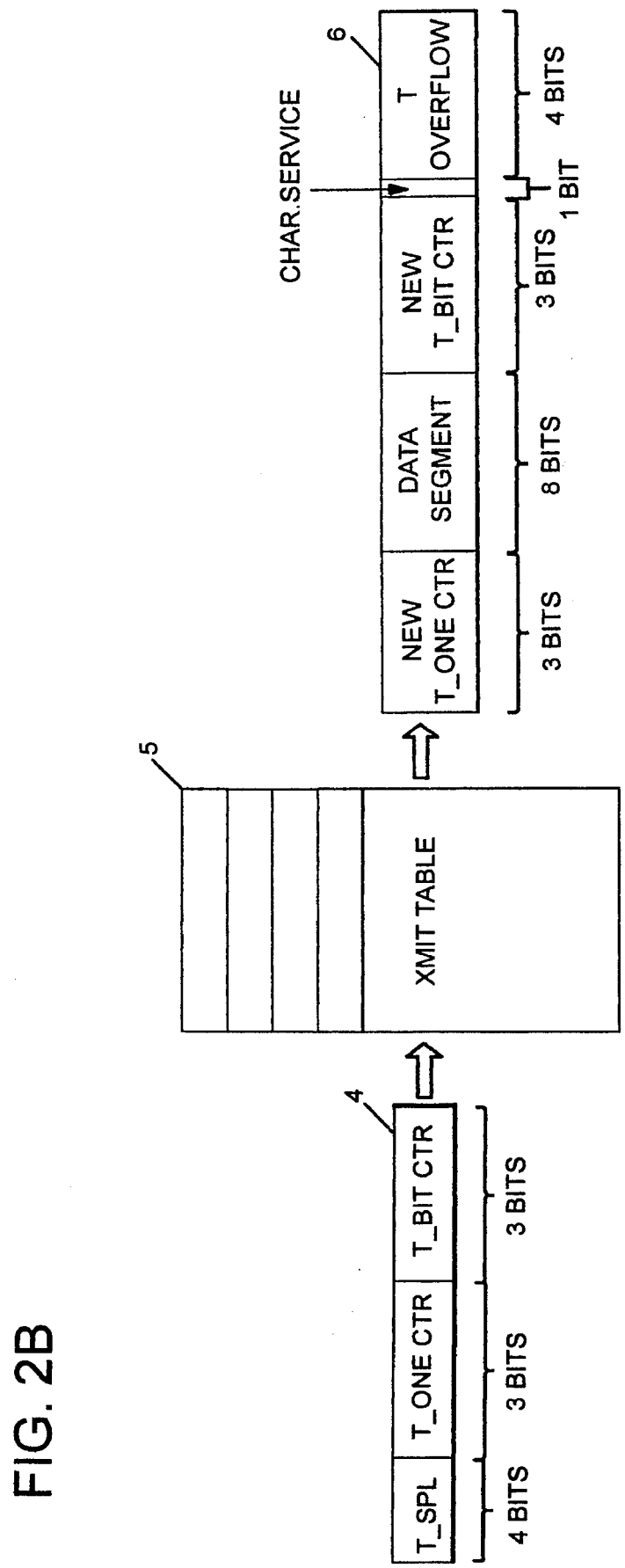

FIG. 2a and 2b respectively illustrates the format of the receive and transmit tables which are required in the parallel processing method of the HDLC bit stream according to the present invention. Before accessing the receive table 2, DSP 202 builds an address 1 having 11 bits and which consists in three distinctive fields: a first field, called R-spl, containing the current sample of 4 bits extracted from the HDLC/SDLC bit stream, a second 4-bit field called R-one-ctr which contains-the current number of consecutive ones, a third 3-bit field called R-bit-ctr which contains the number of bits assembled in the character. The access to that receive table provides a 23-bit word 3 which will be used in association with the receive algorithm illustrated in FIG. 3. As illustrated in FIG. 2a, the latter word is composed of a first 4-bit field called New R-one-counter which contains the new value of the R-one-counter parameter which will be used for the next access to the receive table. The 23-bit word also includes a second 3-bit field giving the current value of F, A and I parameters indicating the detection of the traditional flag, abort or idle signal in the received HDLC/SDLC bit stream. A third 8-bit field is called Data-segment and includes the bits which are extracted from the receive HDLC/SDLC frame. A fourth 3-bit field called New R-Bit-counter contains the value of the R-Bit-counter parameter which will be used for the next access to the receive table. A fifth 1-bit field called CHAR-SERVICE indicates that a character has just been assembled and is available for the upper layer, i.e., the telecommunication service routines providing the assembling of the characters in packets etc. . . . . Finally, a sixth 4-bit field, called R-overflow, gives the residual bits which have possibly been received and which will be used for assembling the next character.

Similarly, FIG. 2b illustrates the format of the address 4 which is required in order to access the Xmit table 5. The Address has 10 bits and consists in three distinctive fields: a first field, called T-spl, containing the current sample of 4 bits which are to be inserted into the HDLC/SDLC frame, a second 3-bit field called T-one-ctr which contains the current number of consecutive ones, a third 3-bit field called T-bit-ctr which contains the number of bits already assembled in order to build the HDLC frame. The access to the Xmit table 5 provides a 19-bit word 6 which will be used in association with the Xmit algorithm illustrated in FIG. 4. The latter 19-bit word is composed of a first 4-bit field called New T-one-counter which contains the new value of the T-one-counter parameter which will be used for the next access to the receive table and which will be described hereinafter. The 19-bit word includes a second 8-bit field, referred to as DATA-SEGMENT, and which includes the bits used for progressively building the HDLC frame as described hereinafter. A third 3-bit field called New T-Bit-counter contains the value of the T-Bit-counter parameter which will be used for the next access to the receive table. A fourth 1-bit field called CHAR-SERVICE indicates that 8 further bits of the HDLC bit stream has just been assembled by the Xmit process which will be described with respect to FIG. 4. Finally, a fifth 4-bit field, called T-overflow, gives the residual bits which were possibly existing in the currently processed sample when a set of 8-bits of the HDLC bit stream has been assembled. Those residual bits will be used in order to build the next group of bits of the HDLC frame.

Figure 3:
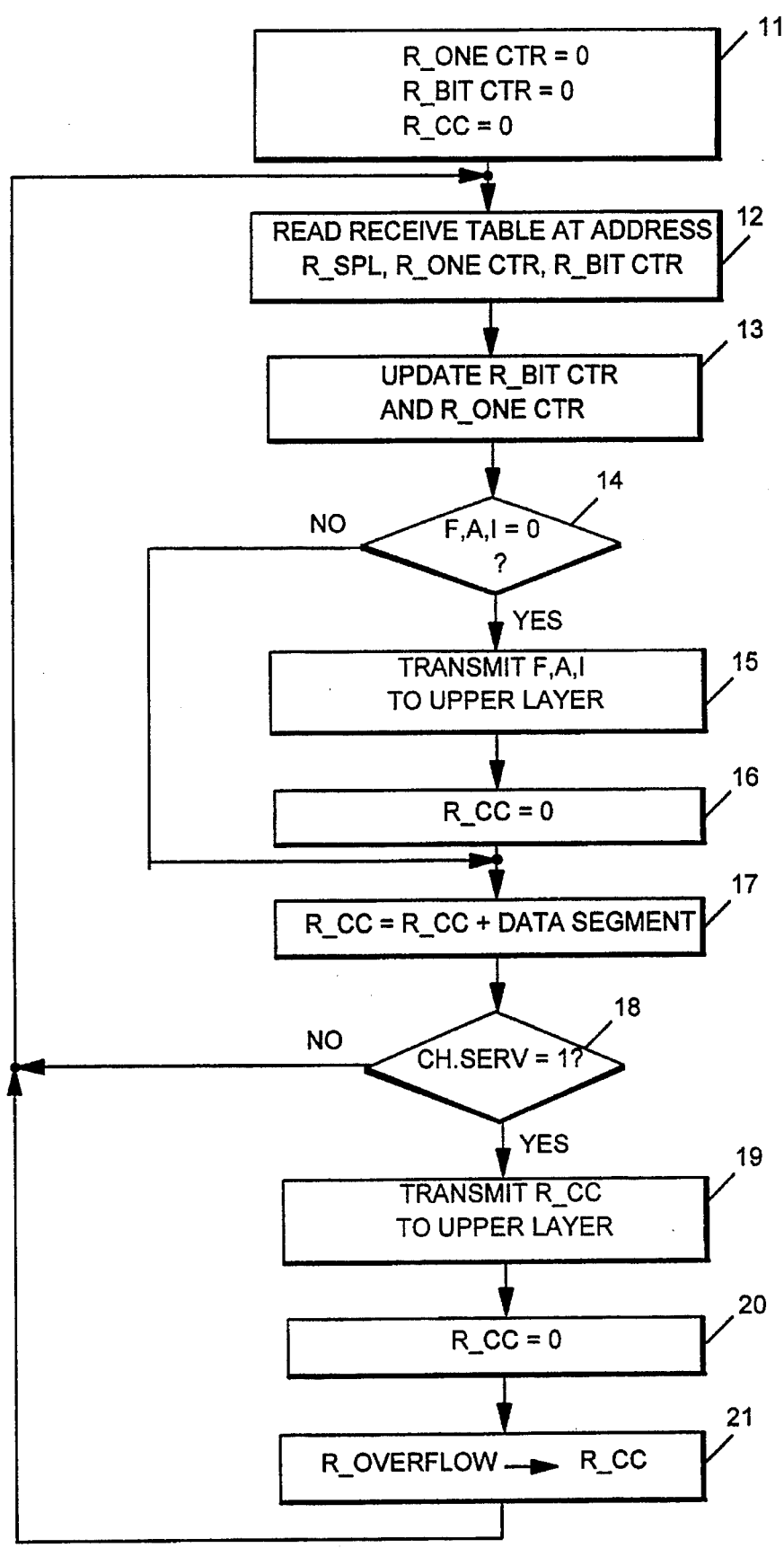
FIG. 3 describes the algorithm of the receive part of the parallel processing method according to a first embodiment of the invention FIG. 4 describes the algorithm used in the transmit part of the parallel processing method according to the first embodiment of the invention.

FIG. 3 illustrates the receive algorithm which allows the parallel processing of the HDLC bit stream stored in the RAM storage 203/204. The purpose of this algorithm is to provide to an upper layer of telecommunications control the information: Flag, Abort, Idle in addition to the received characters which are extracted from a serial HDLC/SDLC bit stream stored in RAM 204 (R-spl). The algorithm begins with an initialization step 11 during which DSP processor sets R-one-ctr, R-bit-ctr and R-cc to zero. Then, in step 12, the processor extracts from the data field of RAM storage 204 a first sample R-spl, that is to say a set of 4 bits coming from the received HDLC/SDLC frame. By associating with it the current value of R-one-counter (R-one-ctr) and R-Bit-counter (R-bit-ctr), the DSP processor forms an 11 bit address which is used for accessing Receive table 2 loaded in RAM storage 203/204. Then, in step 13, DSP processor 202 extracts from the 23-bit word read into receive table 2 the value of the New R-one-ctr (first field) and New R-bit-ctr (fourth field) in order to update the value of R-one-ctr and R-bit-ctr parameters. In step 14, a test is performed in order to determine whether one among the flag, idle or abort signals has been detected in the received HDLC bit stream. This test is achieved by successively comparing one bit of the second field of word 3 to 1. If a "1" actually exists in one bit of that second field, DSP processor 202 concludes that the detection of one among the corresponding signals: Flag, Idle or Abort, has occurred, and transmits that information to the upper layer, in step 15. The upper layer generally provides the protocol support services software of upper level, such as determining the opening flag, the closing flag, extracting the address field, data field, computing the frame checking sequence, assembling characters in packets, etc. . . . Then, in step 16, the DSP processor resets R-CC parameter to zero and proceeds to step 17. If none of the Flag, Abort or Idle signals were detected in step 14, i.e., the second field contains the value '000', the process proceeds to step 17 where the DSP updates the current value of R-CC with the value of the data-segment existing in the third field of the 23-bit word read from the receive table 2. This update is achieved by performing an OR operation between the current value of R-CC and the data-segment field. The on-going update of the R-CC value allows progressive assembly of the 8-bit character which is extracted from the HDLC frame. Then, in step 18, the DSP 202 compares the fifth field of the 23-bit word read from receive table 2 with "1" in order to detect the presence of the CHAR-SERVICE bit indicating that a full 8-bit character has been assembled in register R-CC and is available for further processing by the upper telecommunication services layer. If the CHAR-SERVICE field contains a zero, this means that a full character is not yet available in R-CC and processor 202 goes back to step 12 in order to process the next 4-bit sample extracted from the HDLC frame. If CHAR-SERVICE bit is equal to one, then the DSP processor transmits that assembled character loaded in R-CC to the upper layer, at step 19. In step 20, the DSP processors sets again R-CC to zero. In step 21, the latter register is updated with the R-overflow field of the read 23-bit word in order to take into account the possible existence of bits corresponding to the next character for assembly in the last processed 4-bit sample. Then, the process proceeds to step 12 again where DSP processor extracts a further 4-bit sample consisting of a new set of 4 bits extracted from the received HDLC frame.

Figure 4:
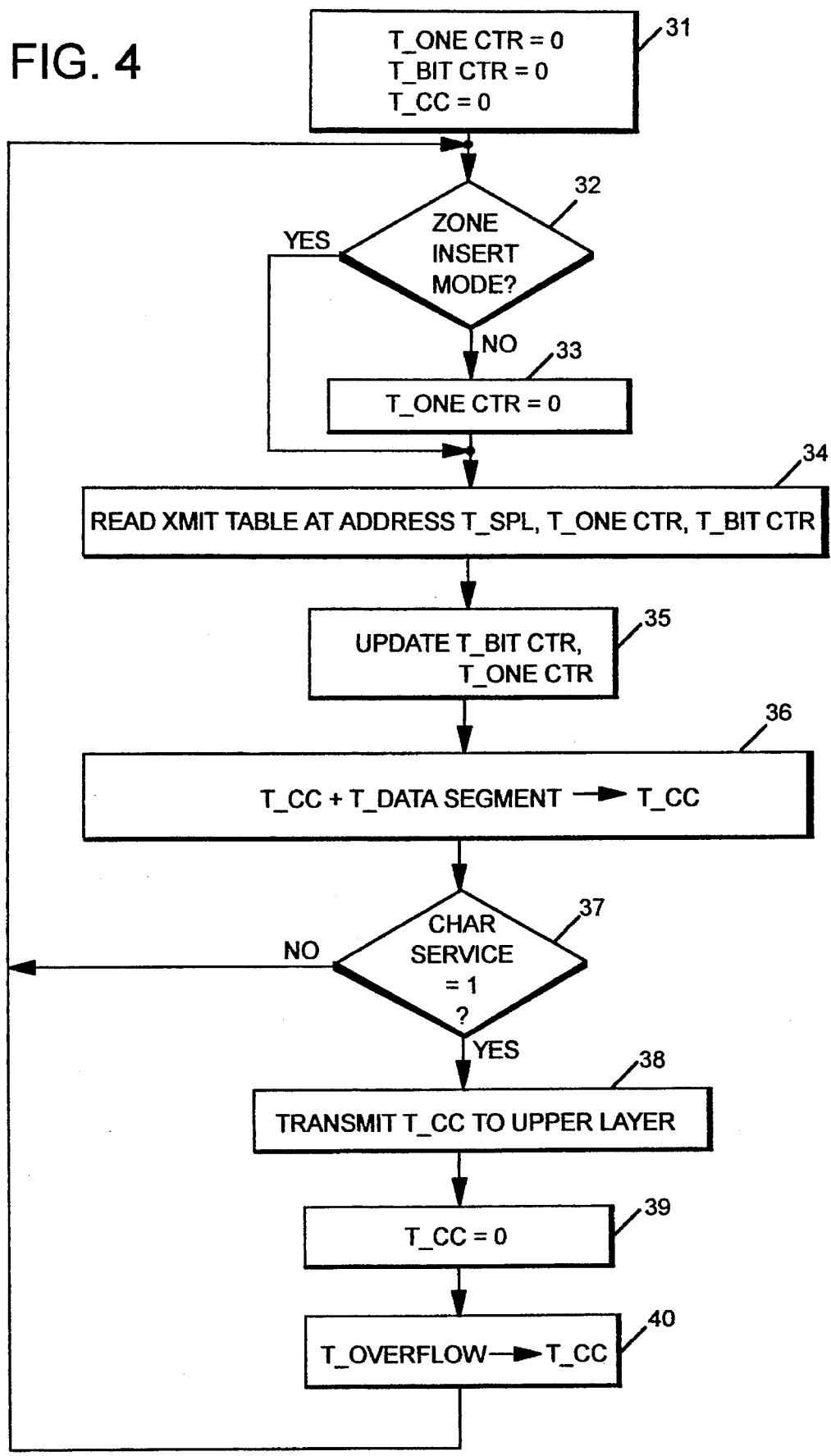

FIG. 4 illustrates the Xmit algorithm which allows parallel processing of the HDLC characters stored in the RAM storage 203/204 to build the bit stream to be transmitted on the line. The algorithm begins with an initialization step 31 during which DSP processor 202 sets T-one-ctr, T-bit-ctr and T-cc to zero. Then, in step 32, DSP processors tests whether the HDLC frame assembling process is in a ZERO-INSERT mode or not The ZERO-INSERT mode is required when the data to be transmitted are located within a HDLC frame, that is to say, are separated by two flags and not required to transmit Flag, Abort or Idle. If the process is not in a ZERO-INSERT mode, then processor 202 sets T-one-ctr to zero, in step 33, and then proceeds to step 34. In the contrary case, the process directly proceeds to step 34 where DSP processor 202 forms a 10-bit address in order to access Transmit table 5 of FIG. 2b. This address is formed by adding to the 4-bit sample of data to be inserted into a HDLC bit stream, T-spl, the current value of T-one-ctr and T-Bit-counter. By reading the Xmit table 5 loaded in RAM storage 203/204, the processor gets, in step 34, a 19-bit word, the format of which is illustrated in FIG. 2b. Then, at step 35, the DSP processor 202 extracts from the latter word the value of the New T-one-ctr (first field) and New T-bit-ctr (third field) in order to update the current value of T-one-ctr and T-bit-ctr parameters. Then, step 36, the DSP processor 202 updates the current value of T-CC with the value of the Data-segment existing in the second field of the 19-bit word read from the Xmit table 5. This update is achieved by performing an OR operation between the current value of T-CC and the Data-segment field. Similarly to the above, the on-going update of the T-CC value allows progressive assembly of a set of 8 bits of the HDLC bit stream which is to be transmitted either to the DTE or the telecommunication line. Then, in step 37, the DSP 202 compares the fourth field of the 19-bit word read from Xmit table 5 to "1" in order to detect the presence of the CHAR-SERVICE bit indicating that a set of 8 bits of the HDLC frame is available for further processing by the upper telecommunication services layer or routines. If CHAR-SERVICE field contains a zero, this means that the computing process of T-CC parameter is still in progress and that further 4-bit samples are required before the next 8 bits of the HDLC frame becomes available. In this case, processor 202 goes back to step 32 in order to process a next set of 4 bits corresponding to the character to be assembled in a HDLC frame. If CHAR-SERVICE bit is equal to one, then DSP processor transmits the available set of 8 bits which are loaded in T-CC to the upper layer, at step 38. In step 39, the DSP processor sets again T-CC to zero. At step 40, the latter register is updated with the T-overflow field of the read 19-bit word in order to take into account the possible existence of residual bits. Then, the process proceeds to step 32 again where the DSP processor extracts a further 4-bit sample in order to continue the elaboration of the HDLC frame.

The Receive table has a size which is twice that of the Xmit table since the former is addressed by means of a 11-bit address while the second only requires a 10-bit address. The Receive table requires a storage having a size of 2K 23-bit words, or approximately 6K bytes. In the latter case, the read operation will involve three elementary READ operation of the 8-bit storage. Similarly, the Xmit table requires a storage size of 1K 19-bit words, or an approximate storage of 3K bytes. It should be noticed that the size of one sample, either the R-spl or the T-spl, has been arbitrarily fixed at 4 in order to minimize the size of the memory while maintaining a sufficient level of parallel processing. However, the skilled artisan will straightforwardly adapt the size and the format of the two tables so that more than 4 bits can be processed in parallel.

In a second embodiment of the invention, the size of the storage which is required in the RAM in order to store the tables is minimized at the cost of a slight increase in the DSP resources. That second embodiment requires three small distinctive tables.

Figure 5A:
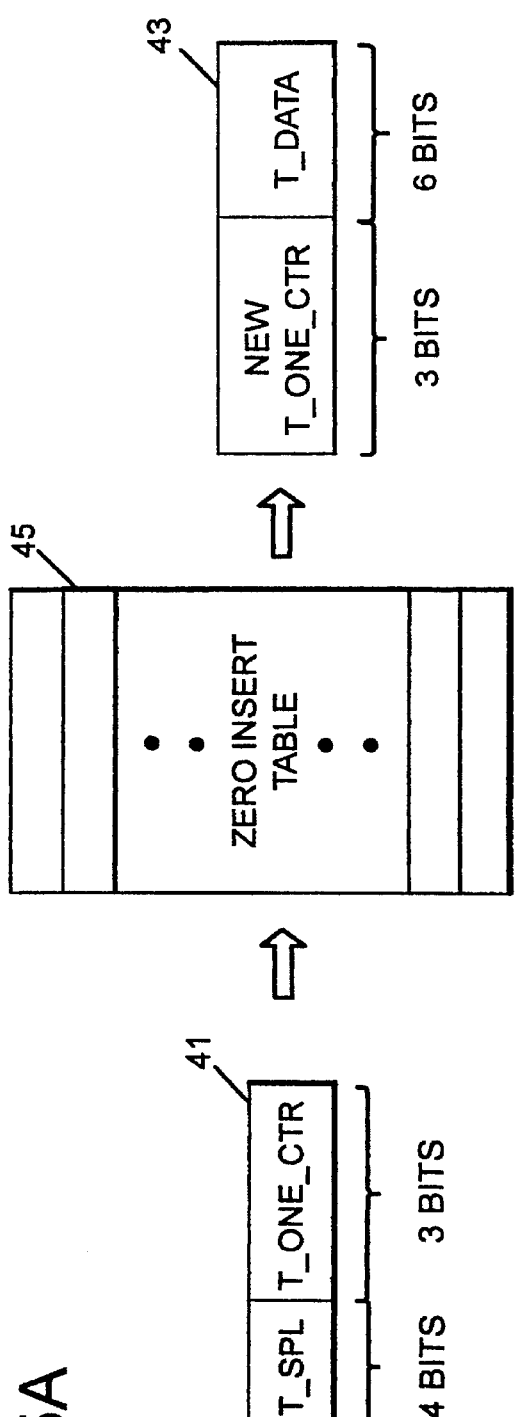
FIGS. 5a, 5b and 5c illustrate the ZERO-INSERT, ZERO-DELETE and CHAR-SYNCHRO tables used in a second embodiment of the invention.
Figure 5B:
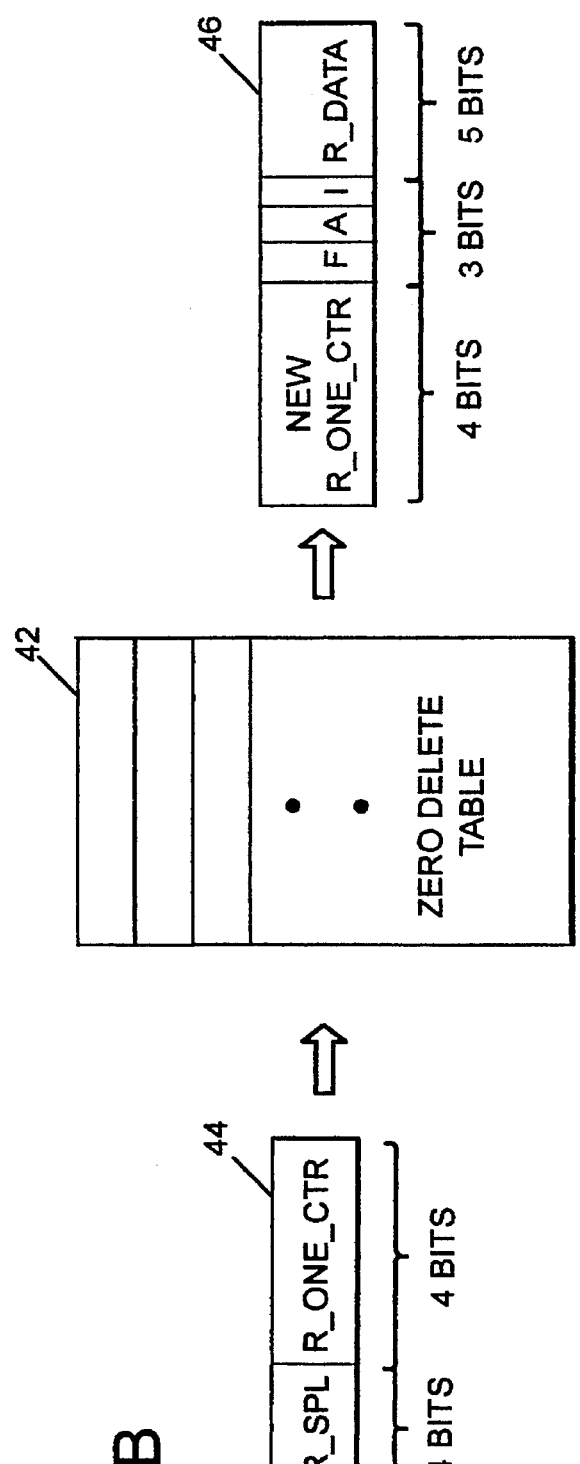
Figure 5C:
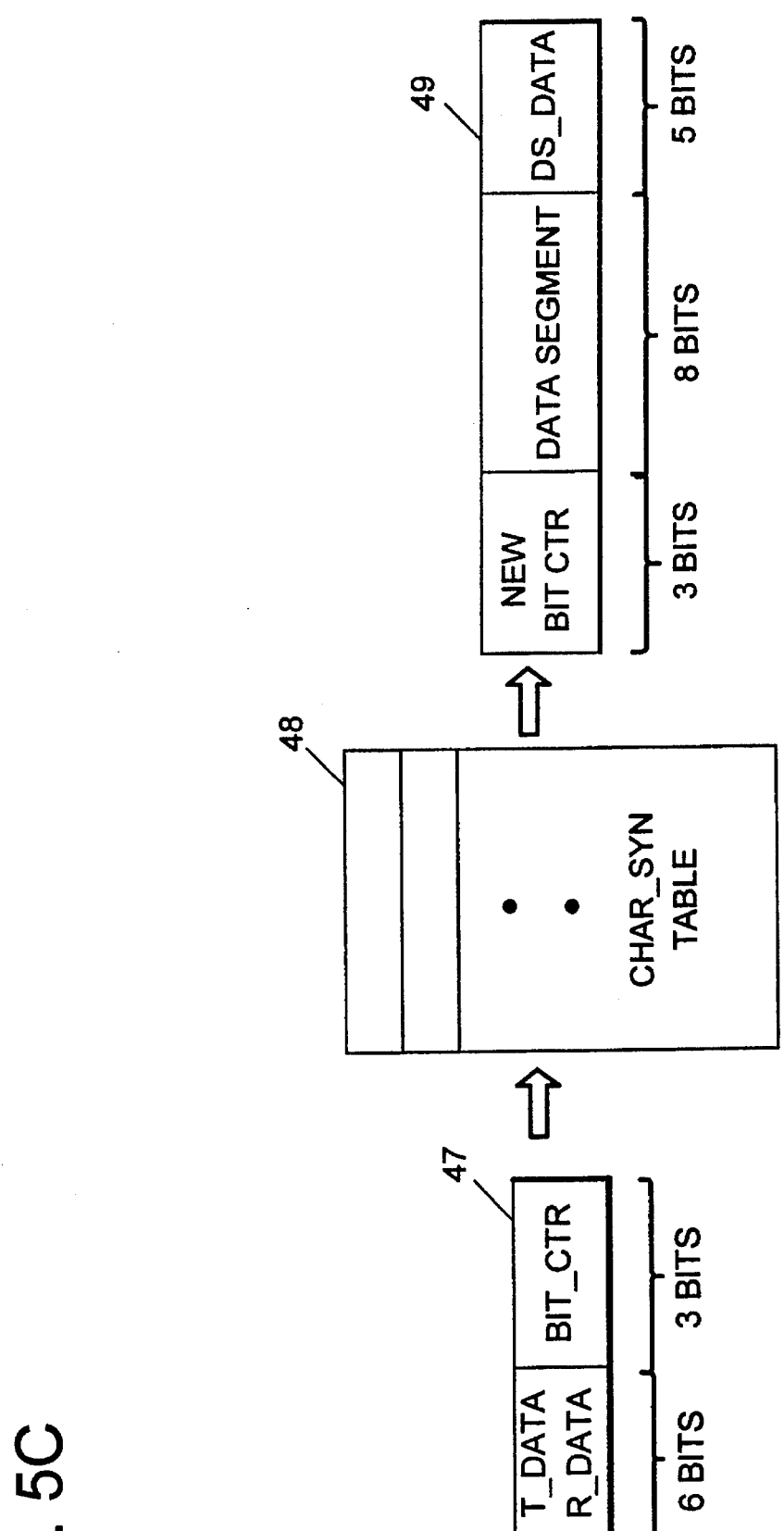

FIG. 5a, 5b and 5c illustrates the format of those three tables which are required in the parallel processing method according to the second embodiment of the invention. The receive process provides the extraction of the data bits from the HDLC/SDLC bit stream by means of a "ZERO DELETE" table 45 and a "CHAR-SYNCHRO" (Character Synchronization) table 48 while the transmit process elaborates the HDLC bit stream by means of the latter table in combination with a third "ZERO INSERT" table 42. With respect to FIG. 5a, ZERO INSERT table 42 is accessed by means of a 7-bit address 41 comprising two distinctive fields: a first field called T-spl consisting of the 4-bit sample extracted from the byte to be inserted within the HDLC/SDLC frame, and a second 3-bit field called T-one-ctr containing the current number of consecutive ones since the last zero. The addressing of ZERO INSERT table 42 provides a 9-bit word 43 comprising a first 3-bit field containing the value of NEW-T-one-ctr and a second 6-bit T-data field containing the residual data which will be used for addressing the CHAR-SYNCHRO table. Similarly to the above, the NEW-T-one-ctr (New-Transmit-one-counter) contains 3-bits of data which is needed for the next access of the ZERO-INSERT table 42 as described hereinafter with respect to FIGS. 7a and 7b. With respect to FIG. 5b, ZERO-DELETE table 45 is accessed by means of an 8-bit address 44 comprising two distinctive fields: a first field called R-spl consisting of the 4-bit sample extracted from the HDLC/SDLC bit stream, a second 4-bit field called R-one-ctr containing the current number of consecutive ones. The addressing of that ZERO-DELETE table 45 provides a 12-bit word 46 comprising a first 4-bit field containing the value of NEW-R-one-ctr; a second 3-bit field representative of the Flag, Abort, and Idle signals (FAI) which possibly exist in the HDLC/SDLC frame; a third 5-bit R-data field containing the residual data which will be used for addressing the CHAR-SYNCHRO table. That third field gives the data bit information after zero deletion. Its length may be from zero to 4.

Similarly to the above, the NEW-R-one-ctr (New-Receive-one-counter) contains 4-bits of data which is needed for the next access of the ZERO-DELETE table 45 as described hereinafter with respect to FIGS. 6a and 6b.

The format of the last CHAR-SYNCHRO table is illustrated in FIG. 5c. That table is loaded with 16-bit words comprising a first 3-bit field called New-bit-ctr containing the number of bits assembled in the character, a second 8-bit field containing the DATA-SEGMENT required for progressively assembling the character, (containing the significant portion of R-data or T-data input correctly positioned according to the value of Bit-ctr input), and a third 5-bit field containing the residual data DS-data. CHAR-SYNCHRO table 48 is addressed by means of a 9-bit address 47 comprising a first 6-bit field loaded with the residual data extracted from the word read in one of the two ZERO-INSERT table 42 (T-data having 6 bits or ZERO-DELETE table 45 R-data having 5 bits but to which is associated a leftmost 6th zero bit in order to form the pattern 0xxxxx). A second field of address 47 comprises the value of bit-ctr which is extracted from the last word read in CHAR-SYNCHRO table 48. The format of those fields are summarized at the end of the specification.

Figure 6B:
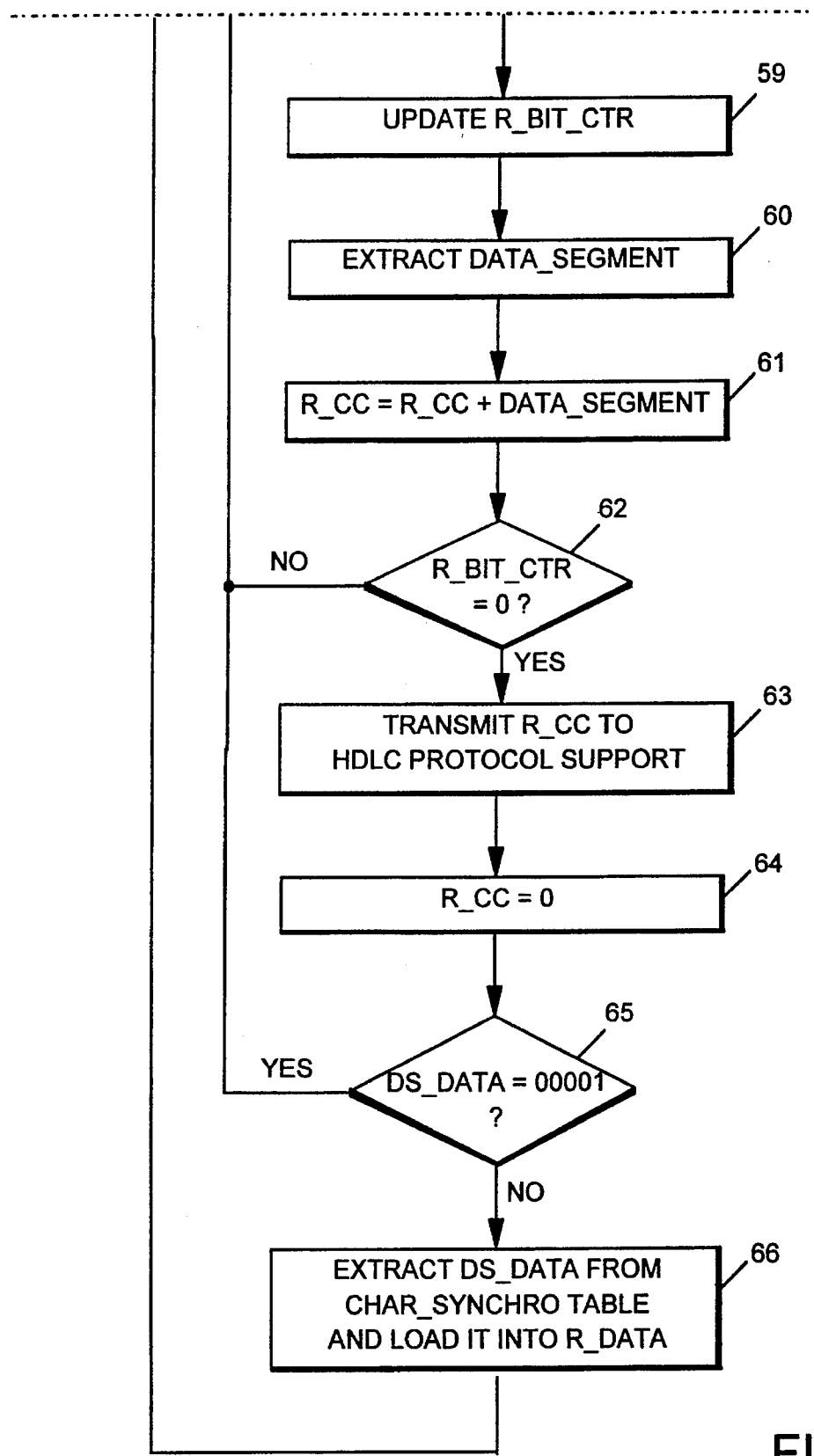
Figure 7A:
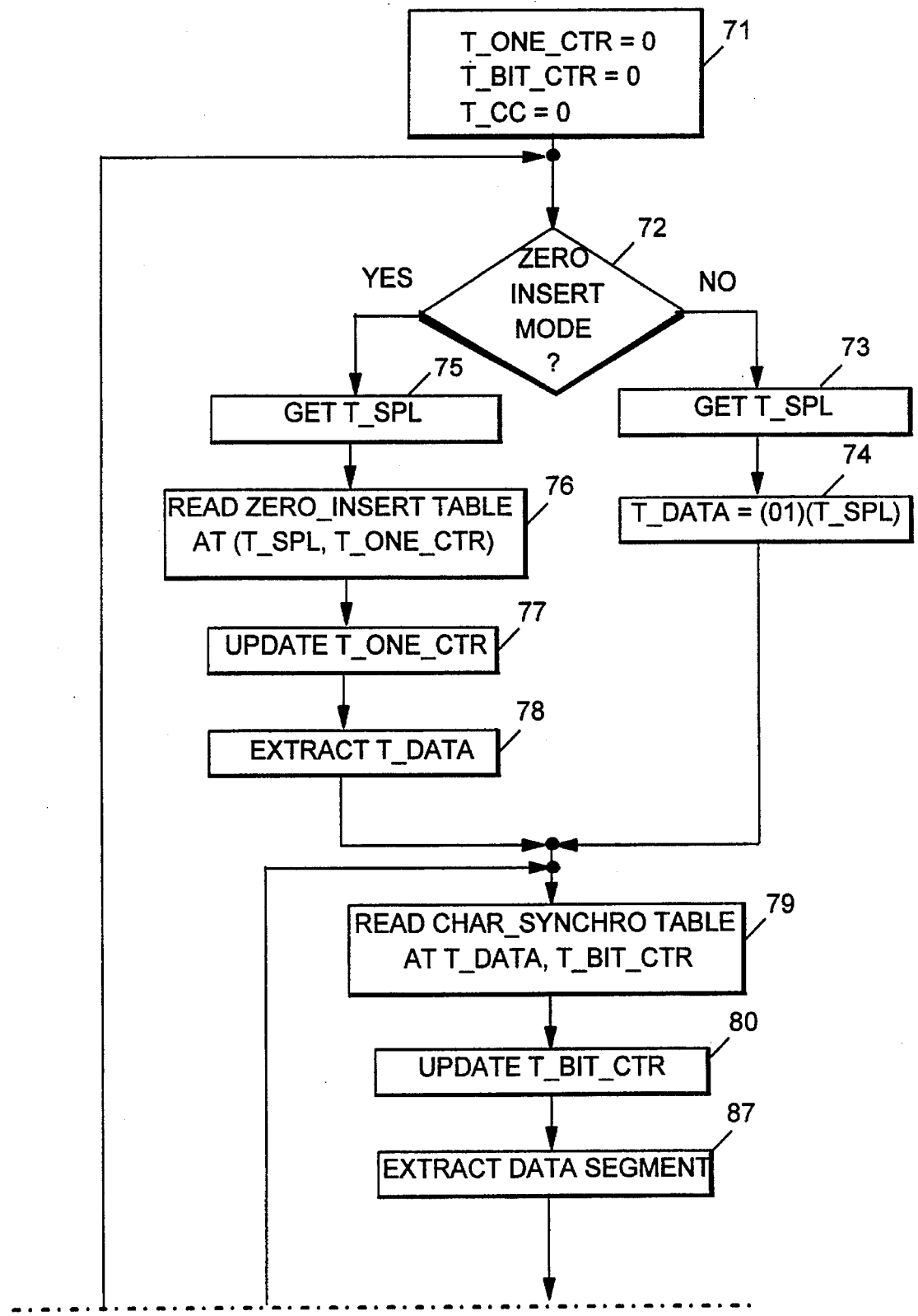
FIGS. 7a and 7b illustrate the transmit process of the parallel processing method according to the second embodiment of the invention.
Figures 7, 7B:
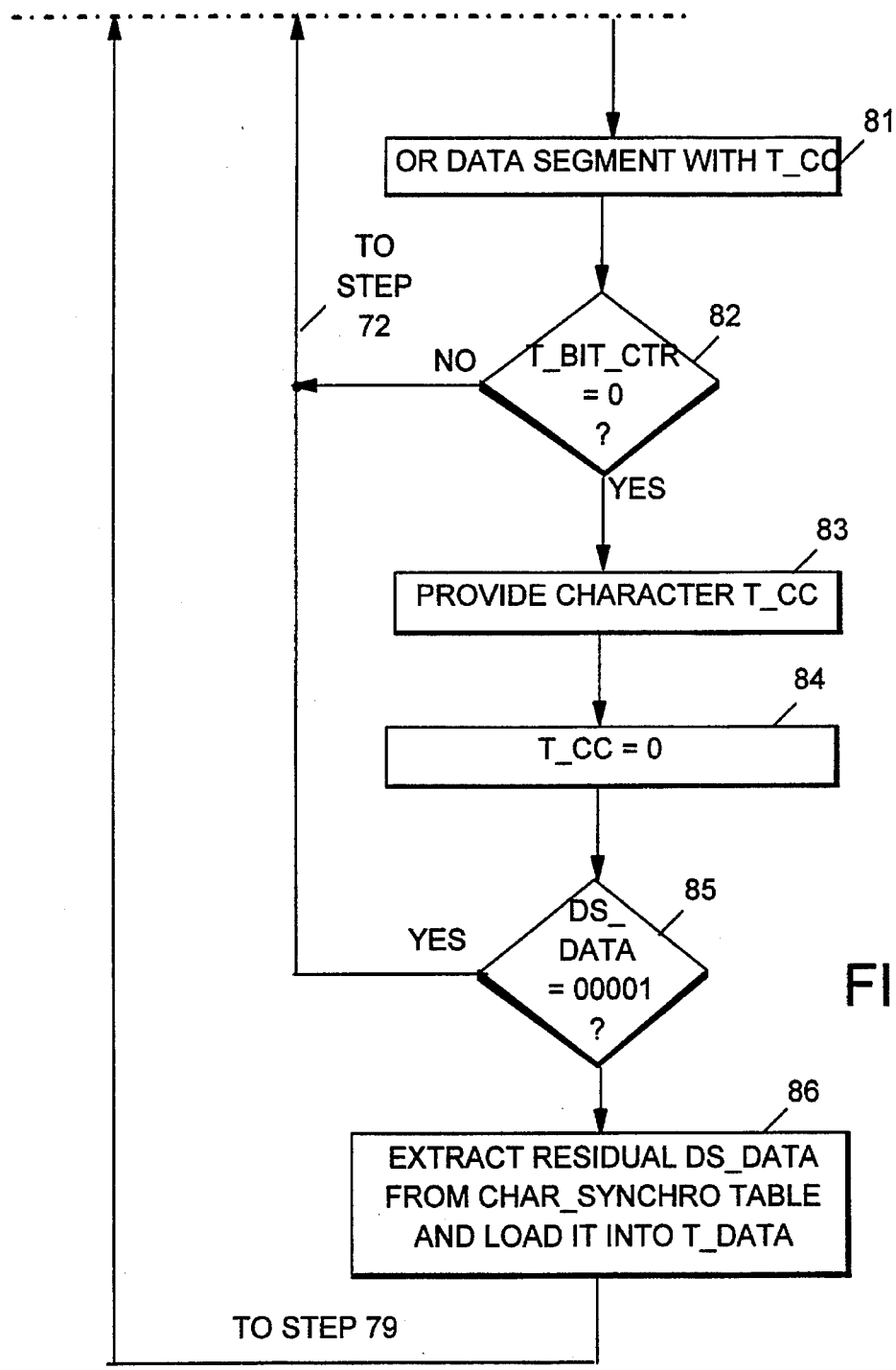

FIG. 6 illustrates the receive algorithm in the second embodiment of the invention providing the parallel processing of the HDLC bit stream by means of ZERO-DELETE table 45 and CHAR-SYNCHRO table 48. The algorithm begins with an initialization step 51 during which DSP processor sets R-one-ctr, R-bit-ctr and R-cc to zero. Then, the DSP process or extracts one 4-bit R-spl sample from the HDLC/SDLC bit stream located within the data field 204 of RAM storage. As mentioned above, the latter bit-stream comes either from line interface 207 after the appropriate signal demodulation processing, or directly from the DTE. Processor 202 forms a 8-bit address with the above 4-bit R-SPL sample and the current value of R one counter, and reads ZERO-DELETE table 45 at the corresponding address, in step 52. Then, in step 53, DSP processor 202 updates the contents of R-one-ctr with the value extracted from the first field of the 12-bit word read into the latter table. In step 54, the processor checks whether one among the Flag, Abort or Idle signal has been detected by testing the value of the F, A and I indicators read into the ZERO-DELETE table 45. In such a case, i.e., if one among the F, A and I is equal to one, the process goes to step 55 and the actual values of F, A and I are transmitted to the upper SDLC protocol support layer. Similarly to the above, that upper layer manages upper HDLC layer functions, such as determining the opening flag, the closing flag, extracting the address field, data field, computing the Frame Checking sequence, etc. . . . Then, in step 56, the contents of R-bit-ctr and R-CC are set to zero and the process proceeds to step 57. If none of the F, A and I signals were present in the word read in step 54, that is to say F=A=I=O, then the process proceeds to step 57 where the DSP processor 202 extracts the residual R-data from the 12-bit word read into ZERO-DELETE table 45. Then, the processor reads the CHAR-SYNCHRO table 48 at the address formed by the latter residual R-data bits and the bits contained into R-bit-ctr. At step 59, the value of R-bit-ctr is updated with the contents of the first 3-bit field of the 16-bit word read into the latter table. At step 60, DSP processor extracts the value of the data-segment, i.e., the contents of the second 8-bit field of the word read into CHAR-SYNCHRO table 48 as shown in FIG. 5c. That value is logically OR'ed with the contents of the current character loaded into R-CC register, in step 61. The character extracted from the HDLC/SDLC bit stream is therefore progressively assembled and stored in R-CC register. Then, in step 62 illustrated in FIG. 6b, the value of R-bit-ctr is compared to zero. If R-bit-ctr is not equal to zero, then the process proceeds to step 52 again in order to process a further 4-bit sample. In the contrary case, a whole character has just been assembled and is available for further processing by the upper SDLC protocol support services, at step 63. Then, at step 64, the contents of R-CC is set to zero and a test is performed, in step 65, in order to determine whether there is some residual data to be considered in the assembling process of the next character. This is achieved by comparing the value of DS-data to 00001. If DS-data is equal to 00001, indicating the lack of residual data, the process proceeds to step 52 for the processing of the next sample. If DS-data is not equal to 00001, indicating that at least one data bit of the last R-data corresponds to the next character which will be assembled, the DSP processor extracts the latter residual data, loads the contents of DS-data in R-data, and proceeds to step 58 for a further access to the CHAR-SYNCHRO table 48. This allows initialization of the R-CC to the appropriate value, taking into account those residual data. FIG. 7a and FIG. 7b illustrate the transmit part of the parallel processing method of building HDLC/SDLC frames which are to be transmitted to the Data Terminating Equipment 209. The HDLC bit stream is also likely to be processed by the DCE in accordance with an appropriate modulation algorithm which computes a series of Pulse Code Modulation words, directly stored in RAM storage 203/204, and transmitted to line interface 207 via D/A circuit 216. The process starts with an initialization step 71 where the value of T-one-ctr, T-bit-ctr and T-CC are set to zero. Then, the DSP checks whether the process is or is not in a Zero-Insert mode, at step 72. The choice of the appropriate mode is performed by the upper protocol support services according to the nature of data to be inserted within the HDLC/SDLC bit-stream. The Zero-Insert mode is selected when the sample of 4 bits corresponds to data which is a true message and which is located between two HDLC flags: an opening flag and an ending flag. In the converse case, in the non Zero-Insert mode, the transmission of flag or idle signals is continuously performed. When the non Zero-insert mode is selected in step 72, the process proceeds to step 73 where DSP processor 202 gets from the upper telecommunication protocol support services the next 4-bit sample to be transmitted. Then, in step 74, DSP processor elaborates the 6-bit value of T-data by associating the two bits '01' and the bits of the latter sample to transmit in order to form the pattern 01xxxx. Then, the process proceeds to step 79. In the Zero-insert mode, DSP processor 202 gets the 4-bit T-spl sample corresponding to data which are to be inserted between two opening and closing flags, in step 75. Then, at step 76, the DSP processor performs a READ operation of the ZERO-INSERT table 42 of FIG. 5a at the address formed by the four bits of T-spl and the four bits of T-one-ctr. The extraction of the first four bits of the word read provides the value of the New-T-one-ctr which is used for updating T-one-ctr, step 77. Then, the second 6-bit field of the word read provides the value of T-data which will be used for accessing the CHAR-SYNCHRO table 48 in step 78. Then, the process proceeds to step 79 where a READ operation of CHAR-SYNCHRO table 48 at the address formed by (T-data, T-bit-ctr) is performed. This provides a 16-bit word, the first 3-bit field of which allows the update of T-bit-ctr in step 80. Then, in step 87, the processor extracts the 8-bit data segment from the second field of the latter word. Then, in step 81 of FIG. 7b, the processor performs an OR operation between the extracted data segment and the current value of T-CC. Similarly to the above, a 8-bit sample of the HDLC/SDLC bit stream is progressively built and stored in T-CC. At step 82, the processor checks whether the latter 8-bit sample elaboration in progress has now completed. This is achieved by comparing the value of T-bit-ctr to zero. If T-bit-ctr is not equal to zero, indicating that the computing process of the value stored into T-CC is still in progress, the process goes back to step 72 in order to request a further 4-bit sample.

In the converse case, T-bit-ctr is equal to zero and this coincides with the completion of the elaboration of a next 8-bit sample of the HDLC/SDLC bit stream to transmit. In step 83, DSP processor provides the value of T-CC to the appropriate component which will achieve that transmission. If the HDLC/SDLC bit stream is to be transmitted to the DTE, Xmit circuit 213 receives that next 8-bit sample. If the HDLC/SDLC bit stream is to be transmitted to the telecommunication line, then DSP processor provides it to the modulation algorithm for computing of the Pulse Code Modulation (PCM) words which will be transmitted to the D/A circuit 216. Then, in step 84, DSP processor sets the value of T-CC to zero and then proceeds to step 85. In step 85, the processor compares the value of the residual data extracted from the third 5-bit field DS-data of the 16-bit word which was read in CHAR-SYNCHRO table 48 to the value '00001' in order to determine whether there exists residual bits to consider for the computing process of the next 8-bit sample of the HDLC/SDLC bit stream. If the residual data is equal to 00001, this indicates that no residual bit actually exists and the process proceeds to step 72 for processing the next 4-bit sample. If the residual data is not equal to 00001 in step 85, this indicates that the last 4-bit sample processed actually contains at least one bit corresponding to the next 8-bit character to be assembled. Then processor 202 extracts that residual data in step 86, loads the latter into T-data, and goes back to step 79 in order to take into account the latter at least one bit into the computing process of the next value of T-CC. This will be achieved by means of the succeeding READ operation of CHAR-SYN-CHRO table 48 in step 79 in order to extract in step 87 the data segment corresponding to that residual data and, at last, the update of T-CC with that data segment in step 81.

In one specific embodiment of the invention, the two or three tables are loaded into the RAM storage after a transfer from PROM or a ROM storage. This avoids the use of a quick PROM or ROM storage since the tables can be stored in one ordinary slow and cheap PROM 205 or ROM which is associated with control processor 200. Thus, only RAM storage 203/204 associated with the powerful digital signal processor 202 is embodied in a fast memory.

The contents of the receive and transmit tables are easy to determine by analyzing, for each address the contents of the word to read in the considered table and by considering the format of the tables. That operation is straightforward for a skilled artisan. The contents of the set of three tables, ZERO-DELETE, ZERO-INSERT and CHAR-SYNCHRO tables which are used in one embodiment of the invention is given for every address at the end of the specification. However, the latter contents can also be directly derived from the table generation process which is described hereinafter.

Indeed, in one specific embodiment of the invention, the tables are directly generated, and loaded into the RAM storage 203/204, by means of a table generation method which is carried out by a specific software program. That software program is loaded into PROM storage 205 and is transferred into RAM storage 203/204 during an initialization procedure starting after the latter power-on. At the completion of the table generation process, the corresponding table generation software is erased from the RAM in order to release the corresponding locations which will be required for further digital signal processing operations. This also allows minimizing the use of the quick and costly RAM storage which is associated with the DSP processor 202.

The table generation process of the three tables of the second embodiment of the invention will now be described. However, the skilled artisan will easily adapt the method in order to generate the two tables which are used in the first embodiment of the invention.

Figure 8:
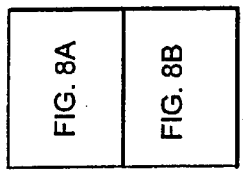
FIG. 8 illustrates the ZERO-DELETE table generation method according to the second embodiment of the invention.
Figure 8A:
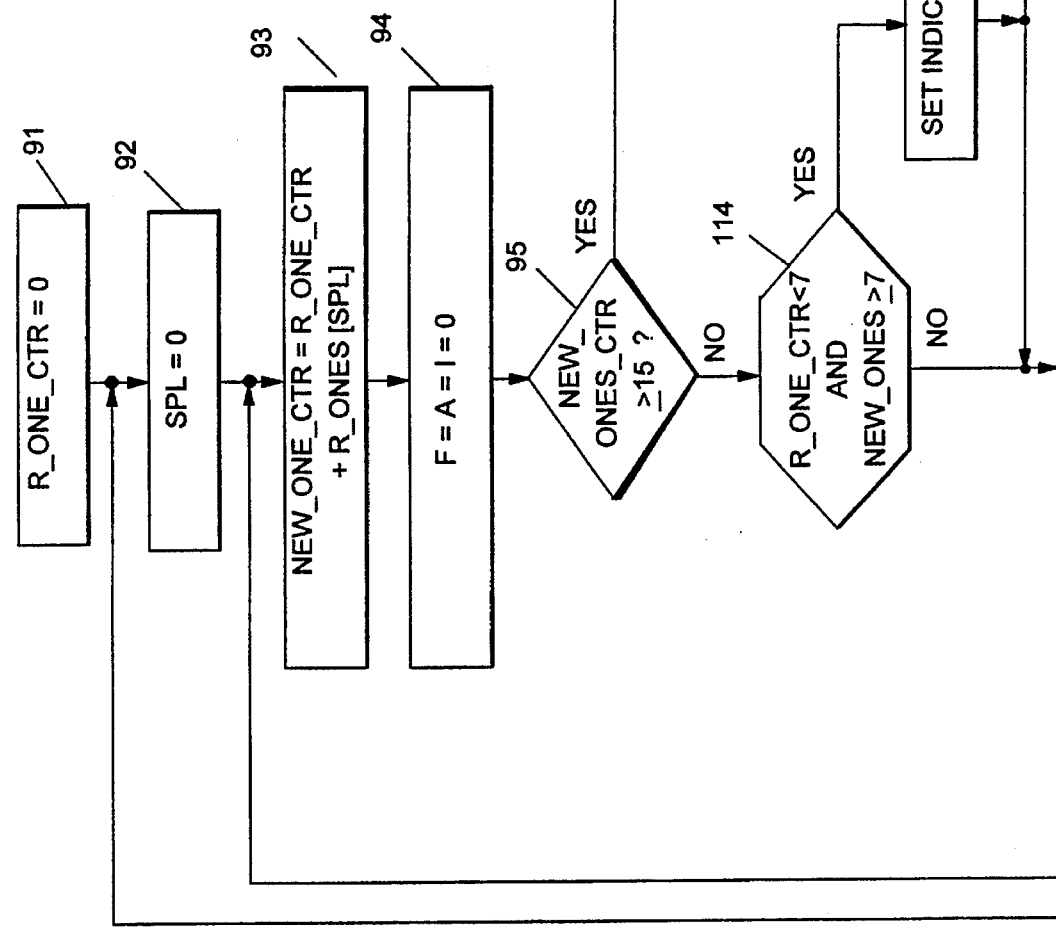
Figure 8B:
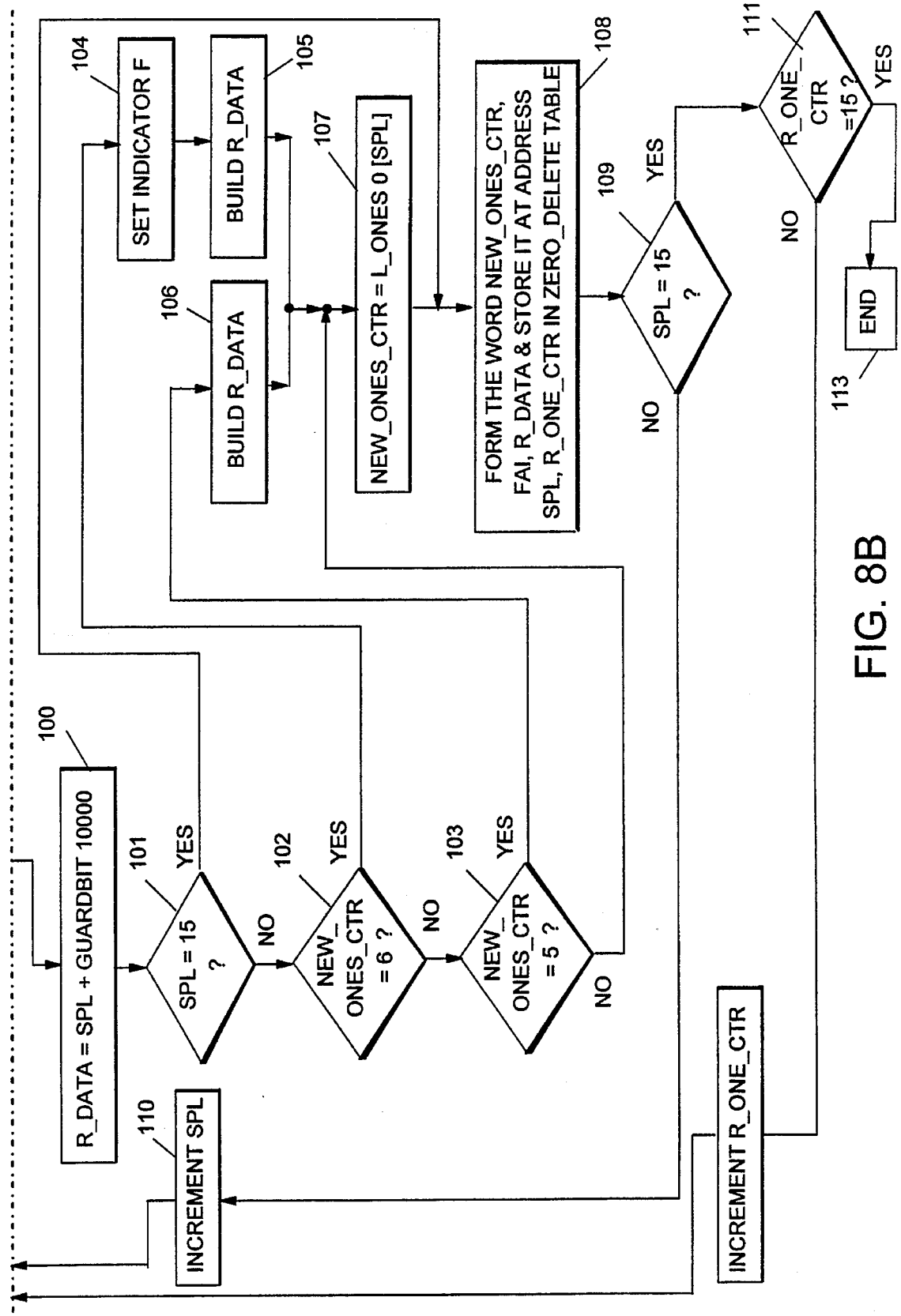

FIG. 8 illustrates the method which is used for generating the ZERO-DELETE table 45. The table comprises 256 words of 12 bits. For every value of R-one-ctr and the 4-bit sample SPL (that is to say for every value of the latter parameters comprised between 0 and 15 in decimal), the method associates three intermediate parameters which are used in the table generation process: R ones corresponding to the number of "1" which are at the right of the sample, L-ones which corresponds to the number of "1" which are at the left of the sample, and L-ones0 which corresponds to the number of "1" of a group of "1" which is located at the left of the sample and which is delimited by a "0" at its right position. For every value of the 4-bit sample, the three above intermediate parameters are given in the following table:

| spl | R-ones(spl) | L-ones(spl) | L-ones0(spl) |
| --- | --- | --- | --- |
| 0000 | 0 | 0 | 0 |
| 0001 | 1 | 0 | 0 |
| 0010 | 0 | 0 | 0 |
| 0011 | 2 | 0 | 0 |
| 0100 | 0 | 0 | 0 |
| 0101 | 1 | 0 | 0 |
| 0110 | 0 | 0 | 0 |
| 0111 | 3 | 0 | 0 |
| 1000 | 0 | 1 | 1 |
| 1001 | 1 | 1 | 1 |
| 1010 | 0 | 1 | 1 |
| 1011 | 2 | 1 | 1 |
| 1100 | 0 | 2 | 2 |
| 1101 | 1 | 2 | 2 |
| 1110 | 0 | 3 | 3 |
| 1111 | 4 | 4 | 0 |

It should be noticed that in the 4-bit sample, the bit which is at the righthand position is the first bit to be received in the HDLC frame. The ZERO-DELETE table generation method begins with a initialization step 91 where the value of R-one-ctr and spl are set to zero. Then, at step 93, the DSP processor 202 performs the operation R-one-ctr +R-ones (spl) and loads the result in the New-one-ctr register. Then, in step 94, the values of F, A and I indicators are set to zero. At step 95, the process tests the value of New-one-ctr in order to determine whether the latter is greater than or equal to 15 (in decimal). If it is, then the process proceeds to step 96 where the value of '15' is loaded into New-one-ctr. Then, in step 97, the processor tests whether the value of R-one-ctr is less than 15. If R-one-ctr is less than 15, indicating the first detection of the idle signal, then processor 202 sets the value of indicator I to 1 at step 98. Then, the process proceeds to step 100. In the converse case, indicating that one idle signal has already been detected in one preceeding 4-bit sample, the process goes directly to step 100. If the value of New-one-ctr was inferior to 15 in step 95, then processor 202 proceeds to step 114 where it tests whether R-one-ctr is less than 7, and simultaneously, New-one-ctr is greater than or equal to 7. If this is true, indicating the detection of the Abort signal, the process proceeds to step 99 where processor 202 sets the value of indicator I to "1". Then, the process proceeds to step 100. If the test performed in step 114 concluded that R-one-ctr is greater than or equal to 7 or New-one-ctr is less than 7, then the process also proceeds to step 100 where processor 202 performs the operation spl+ 10000, that is to say, it builds the receive sample R-data without taking into account the zero-delete operation. Then, in step 101, the value of spl is compared to 15 (in decimal). If the two values are equal, then the process proceeds to step 108. In the converse case, the value of New-one-ctr is compared to 6 (in decimal), step 102. If New-one-ctr is equal to 6, this indicates the detection of a flag signal, and the process proceeds to step 104 where the value of F indicator is set. Then, step 105, the processor elaborates the residual data which possibly corresponds to the beginning of the character which just follows the detected flag, at step 105, using the current value of R-one-ctr and SPL and positioning the guard-bit according to this residual data.

Then, the process proceeds to step 107. If New-one-ctr is not equal to 6 in testing step 12, the processor compares it to the value "5" (in decimal). If the two latter values are equal, then processor builds the value of R-data, step 106, deleting the zero at the place which is determined by the value of R-one-ctr and SPL and then by positioning the guard-bit in order to form the pattern 01xxx (with xxx corresponding to the data after the latter Zero-insert operation).

Then, the process proceeds to step 107. In step 107, the processor updates the value of New-one-ctr by loading the value of L-ones0 which corresponds to the considered SPL sample, and which is given in the above tables. Then, in step 108, the processor forms the 12-bit word with the values of New-one-ctr, FAI, R-data and stores the latter at the location within the RAM storage which corresponds to the address formed by R-spl, R-one-ctr. Then, the processor tests the value of SPL and compares it to 15, in step 109. If SPL is not yet equal to 15, then the processor increments it, at step 110, and goes back to step 93 in order to form the next word of the ZERO-DELETE table 45. If SPL is equal to 15, then, the processor tests the value of R-one-ctr and compares it to 15, in step 111. If R-one-ctr is equal to 15, this indicates that the 256 words of the ZERO-DELETE table 45 have been computed and stored within RAM storage 203/204 and the ZERO-DELETE table generation process completes, at step 113. In the converse case, the processor increments the value of R-one-ctr, step 112, and goes back to step 92 in order to form a further word of the ZERO-DELETE table 45.

Figures 9, 9A:
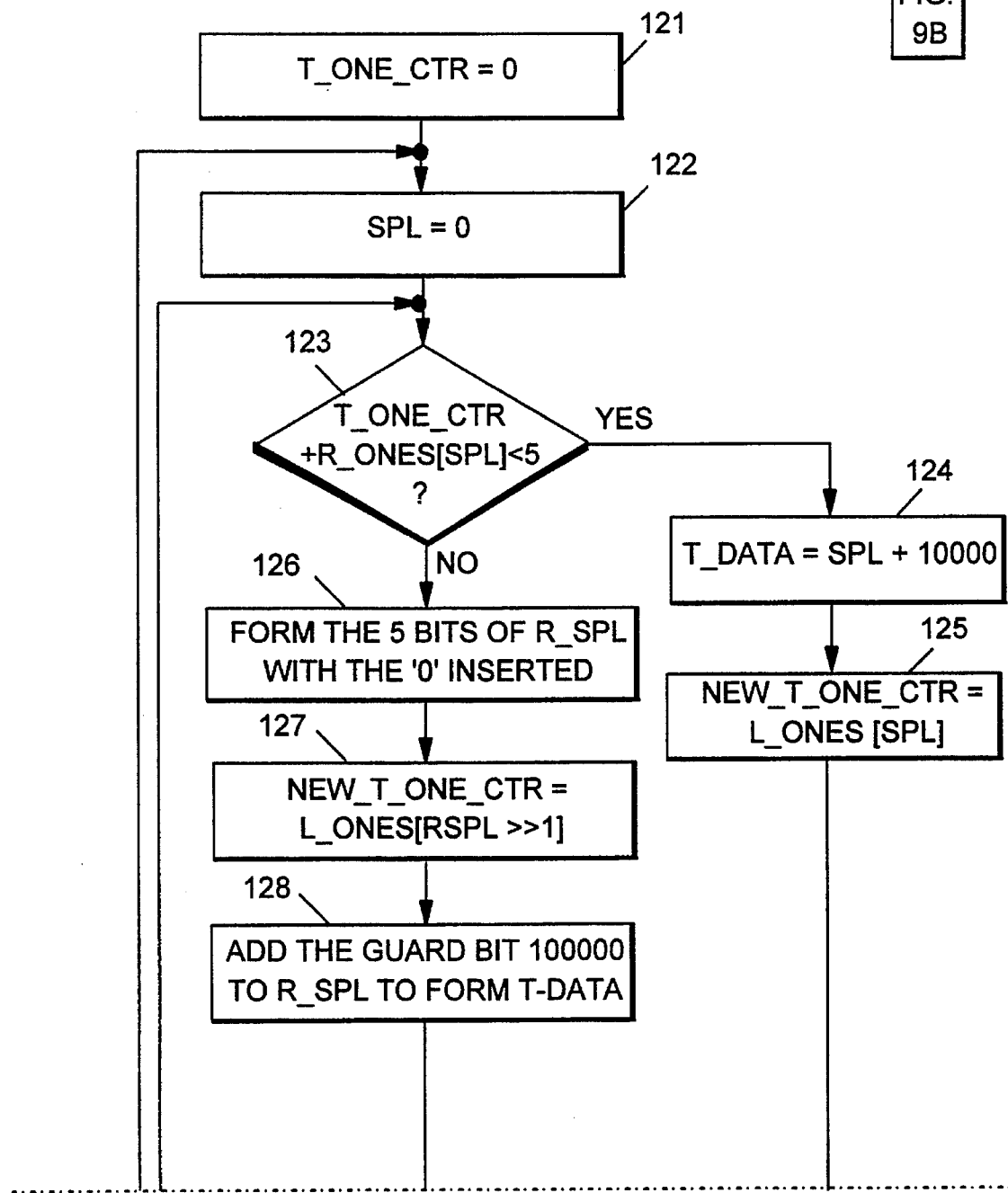
FIG. 9 illustrates the ZERO-INSERT table generation method according to the second embodiment of the invention.
Figure 9B:
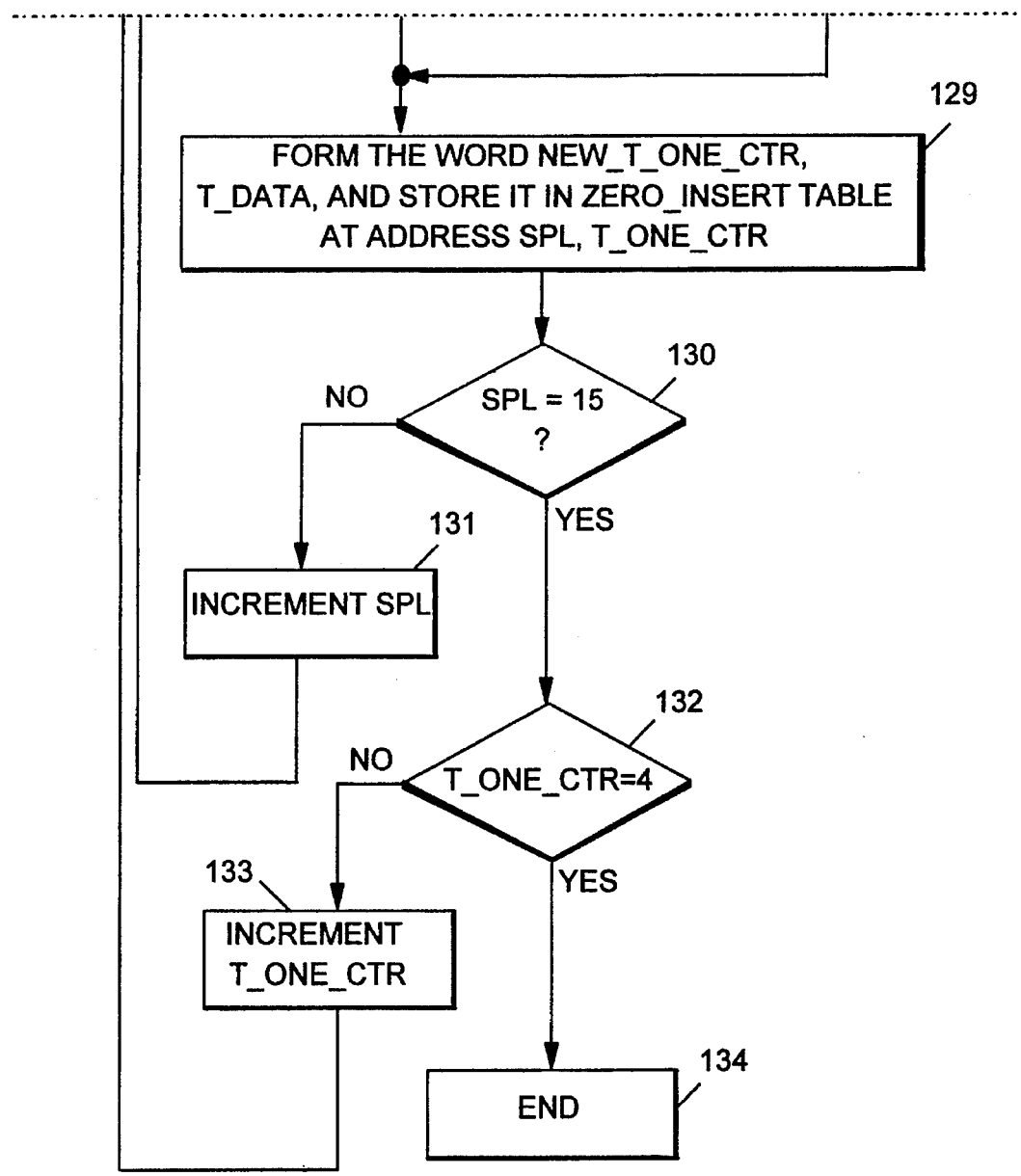

FIG. 9 illustrates the ZERO-INSERT table generation process according to the present invention. This table contains a set of 80 (5×16) distinctive words.

The process starts with an initialization procedure where T-one-ctr, then spl are set to zero, at steps 121 and 122. Similarly to the above, the ZERO INSERT table generation algorithm is performed by successively building one 10-bit word to be loaded into the table for every value of T-one-ctr comprised within (0,4) and for every value of the sample comprised within (0, 15) in decimal. This is achieved as follows:

In step 123, processor 202 computes the value T-one-ctr+R-ones(spl) and looks for whether the result is less than 5 (in decimal). If this is true, this indicates that no zero-insert operation is requested, and the processor performs the operation T-data=spl+guardbit 10000, step 124. Then, the process proceeds to step 125 where New-T-one-ctr is loaded with the value L-ones(spl) which is read in the above table for the considered sample. The process then proceeds to step 129. If the result of T-one-ctr+R-ones(spl) is greater than or equal to 5 in step 123, then processor 202 computes R-spl by adding a Zero at the appropriate place in accordance with the HDLC zero-insert rule, step 126. Then, at step 127, the processor computes the value of New-T-one-ctr which is needed in ZERO-INSERT table 42. This computation is achieved by getting the value of L-ones which corresponds to the value of R-spl computed at step 126 before being shifted one position to the right. The New-T-one-ctr is derived from the value L-ones by means of a right shift process. Then, at step 128, the processor adds the guard bit 100000 to the value R-spl to form T-data and the process proceeds to step 129. In step 129, the processor forms the 10-bit word with the value of New-T-one-ctr, and T-data which have been computed and stores the 10-bit word in the ZERO-INSERT table located within RAM storage 203/204 at the address specified by spl, the T-one-ctr. Then, the processor tests the value of SPL and compares it to 15, at step 130. If SPL is not yet equal to 15, then the processor increments it, in step 131, and goes back to step 123 in order to form the next word of the ZERO-INSERT table 42. If SPL is equal to 15, then, the processor tests the value of T-one-ctr and compares it to 4, step 132. If T-one-ctr is equal to 4, this indicates that the 80 words of the ZERO-INSERT table 42 have been computed and stored within RAM storage 203/204 and the ZERO-INSERT table generation process completes, at step 134. In the converse case, the processor increments the value of T-one-ctr, in step 133, and goes back to step 122 in order to form a further word of the ZERO-INSERT table 42.

Figure 10B:
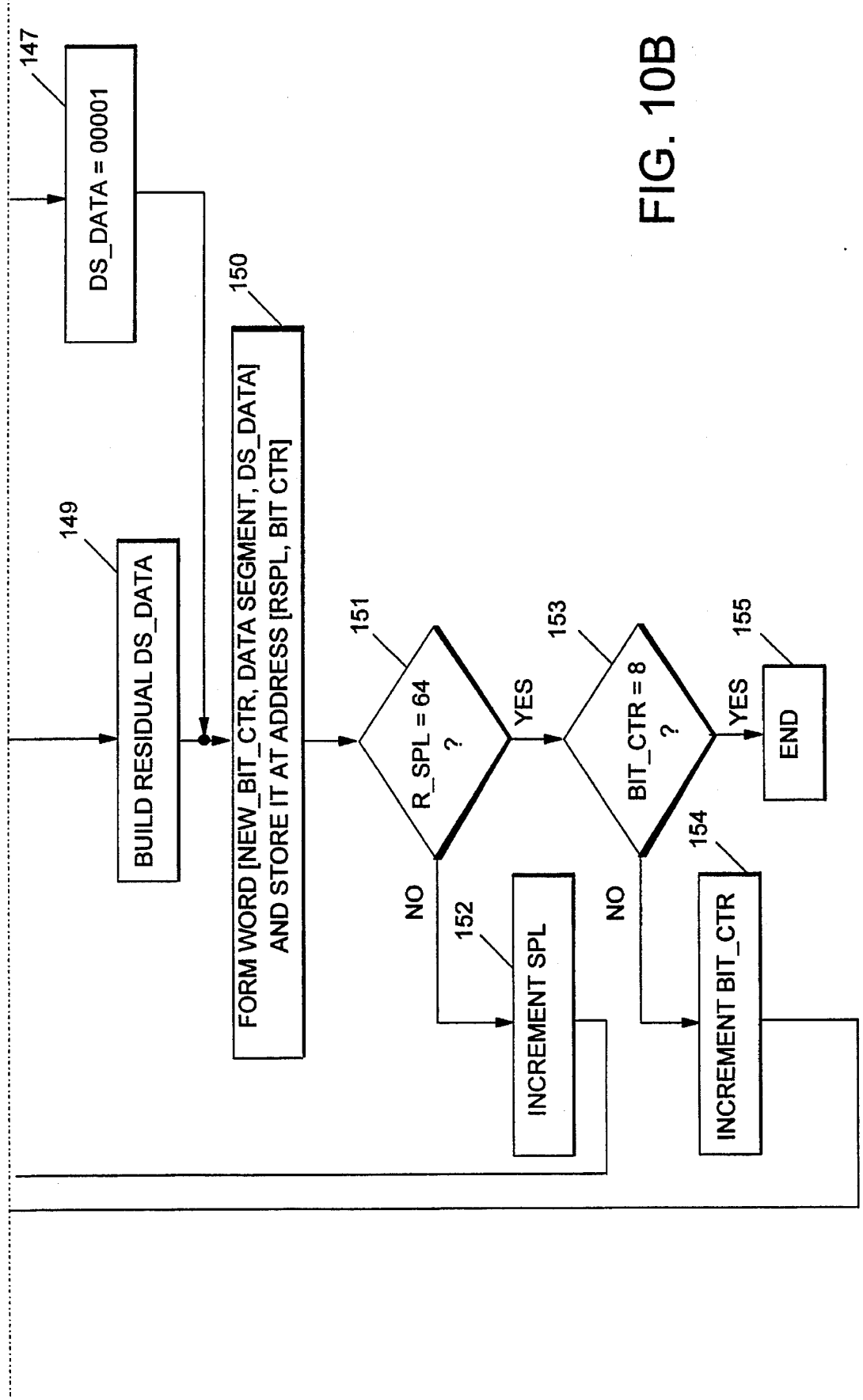
FIG. 10 illustrates the CHAR-SYNCHRO table generation method according to the second embodiment of the invention.

FIG. 10 illustrates the CHAR-SYNCHRO table generation process. That table is accessed by means of the 3-bit value of bit-counter and the 6-bit value of T-data or R_data (the latter being, in fact, 5 bits long and padded with a left zero). It is used as well in the transmission process and the reception process, which allows minimizing the size of the RAM storage. The table appears to have 8×64=512 distinctive locations. Similarly to the above, the table generation process starts with an initialization procedure where the value of Bit-ctr is set to zero, in step 141, and the value of R-spl is set to '000001', at step 142. Then, in step 143, the processor 202 computes the number n of relevant bits in R-spl, at step 143. This is achieved by determining the position of the guard-bit by means of successive left shift operations. Then the DSP deletes the guard-bit from R-spl. Then, at step 144, the processor computes the value of DATA-SEGMENT from the value of R-spl. This is achieved by performing a number of elementary left shift operations on R-spl, the number being equal to the value of bit-ctr. Then, at step 145, the value Bit-ctr +n is computed and the process compares the corresponding result to 8. If the result is less than 8, then the process proceeds to step 146 where that result is loaded in New-bit-ctr. Then, step 147, the residual data DS-data is loaded with the value '00001' and the process proceeds to step 150. If the result of the computation Bit-ctr+n was found to be greater than or equal to 8 in step 145, indicating that a full 8-bit character of the HDLC frame has been elaborated, then the process proceeds to step 148 where the value of New-bit-ctr is set to zero. In step 149, the residual DS-data is built with the residual bits corresponding to the next character of the HDLC/SDLC frame, and by positioning the guard-bit at the place which corresponds to the value of the overflow (Bit-ctr+n−8).

Then, at step 150, the processor forms the 16-bit word with the value of New-bit-ctr, Data-segment, DS-data and stores it in the CHAR-SYNCHRO table 48 at the location specified by the address formed by (R-spl, bit-ctr). Then, the processor tests the value of SPL and compares it to 64, at step 151. If SPL is not equal to 64, then the processor increments it, step 152, and goes back to step 143 in order to form the next word of the CHAR-SYNCHRO table 48. If SPL is equal to 64, then the processor tests the value of Bit-ctr and compares it to 8, step 153. If the latter value is equal to 8, this indicates that the 512 words of the CHAR-SYNCHRO table 48 have been computed and stored within RAM storage 203/204 and the CHAR-SYNCHRO table generation process completes, at step 155. In the converse case, the processor increments the value of Bit-ctr, step 154, and goes back to step 142 in order to build a further word of the CHAR-SYNCHRO table 48.

It should be noticed that the method illustrated in FIGS. 8, 9, 10 for generating ZERO-DELETE, ZERO-INSERT and CHAR-SYNCHRO tables would be straightforwardly adapted by the skilled artisan for elaborating the receive and transmit tables illustrated in FIGS. 2a and 2b, or still for adapting the parallel process so that it simultaneously processes samples having 6, 8 or more bits.

The result of the three table generation processes which are described above in detail, i.e., the actual contents of the ZERO-DELETE, ZERO-INSERT and CHAR-SYNCHRO tables, is given hereinafter for illustrative purpose.

It should be noticed that multiplexing of the DSP resources is easily provided from the parallel processing method according to the present invention. Indeed, a single set of tables, for instance one unique ZERO-DELETE table 45, one unique ZERO-INSERT table 42 and one unique CHAR-SYNCHRO table 48 can be used for n multiplexed HDLC/SDLC bit streams. The multiplexing of the receive or transmit processes which are above described with respect to FIGS. 6 and 7 is easily provided, simply by storing in appropriate registers or locations within RAM, the intermediate results of the process; that is to say, one-ctr, bit-ctr, and R-cc. It therefore appears that the multiplexing of the parallel processing method according to the present invention only requires multiplying the number of registers needed for storing the latter intermediate results. The processing of a high number of HDLC lines can be achieved at a low cost.

It should also be noticed that the DSP resources can still be minimized if the parallel processing method described above is carried out by a specific hardware circuit which performs the elementary operations. Since that hardware circuit only has to perform the different accesses to the tables, to perform the elementary operations described above and stores the corresponding results, a high number of HDLC lines can be provided at the cost of a few additional electronic components and without jeopardizing the Digital Signal Processing resources.

It has been mentioned above that the tables required for performing the parallel processing method in accordance with the present invention are loaded into the RAM storage 203/204 which is a quick storage associated with the DSP. While the preferred embodiment of the invention uses a set of tables stored within RAM storage, it however appears that those could be stored in PROM or ROM storage. It should however be noticed that PROM storage should have quick access time in order to be compatible with the requirements of the DSP resources. However, the parallel processing method of the bit stream still guarantees a good efficiency with ordinary PROM or ROM storages. For instance, a PROM having a 100 nanosecond access time permits the processing of one 4-bit sample every 300 nanoseconds, which corresponds to a line speed of 12 mbps.

It should be noticed that the parallel processing method according to the present invention can be used in any telecommunication equipment which is likely to handle HDLC/SDLC protocols and is not restricted to DCEs and modems. The method is particularly useful for designing terminal adapters for the Integrated Service Digital Network (ISDN). Moreover, the method is not restricted to the use of DSP, but could also be used with a general purpose processor. Hereinafter are summarized, for clarity's purpose, the different definitions of the parameters which are used:

1. With respect to the Zero-insert table 42:

T-spl: corresponds to the 4-bit sample which is extracted from the byte which is to be inserted within the HDLC/SDLC frame.

T-one-ctr: gives the number of consecutive "ONE" which follows the left most ZERO of the part currently processed of the next byte to be transmitted.

New-T-one-ctr: gives the updated value of T-one-ctr

T-data: is formed as follows: the T-spl is possibly modified by the Zero-insert operation, what leads to a 4 or 5 bit pattern. Then, "01" or "1" is concatenated in order to elaborate the 6-bit T-data field as follows: "01" is concatenated at the left if the said possibly modified T-spl is still a 4-bit pattern (01xxxx). "1" is concatenated at the left, if the latter is a 5-bit pattern (1xxxx), in which case a Zero has actually been inserted.

2. With respect to Zero-delete table 45

R-spl: corresponds to the 4-bit sample of the HDLC/SDLC bit stream which is received.

R-one-ctr: gives the number of consecutive "ONE" following the last received ZERO.

New-R-one-ctr: gives the updated value of R-one-ctr.

R-data is formed as follows: the R-spl is possibly modified by a Zero-delete operation. This results in a 4 (if no Zero-delete operation occured), 3 (in the case of a Zero-delete operation), and also 2, 1 or zero bit (in the case of the Flag detection). The 5-bit R-data is then formed by concatenating the guard-bit (and the number of Zero which is required) to that pattern as follows:

1xxxx in the case of a 4-bit pattern (i.e. in the case of data bits and without any Zero-delete operation).

01xxx in the case of data bits and one Zero-delete operation. 001xx in the case of two data bits following a flag.

0001x in the case of 1 data bit following a flag.

00001 in the case of no data bit,

3. With respect to CHAR-SYNCHRO table 48

Bit-ctr: is the number of bits which are already assembled in order to form the next character (either of the HDLC frame to be transmitted or the sequence of characters extracted from the received HDLC frame).

DS-data: similarly to R-data, the format depends on the number of data bits which are included:

1xxxx when 4 data bits still remain and are to be taken into account for elaborating the next character.

01xxx in the case of 3 data bits.

001xx in the case of two bits.

0001x in the case of one bit.

00001 if no bit remains for elaborating the next character.

guard-bit: the bit "ONE" which is located at the left position of one pattern (R-data, T-data, or DS-data). It is used for delimiting the data bits.

For instance 01xxx in R-data is representative of 3 received bits at the right position of the guard-bit ONE.

Data-segment: corresponds to the data bit pattern which is correctly justified according to the value of bit-ctr, and derived from R-data or T-data. The Data-segment value will be logically OR'ed to the value R-CC or T-CC in order to progressively elaborate the character received or transmitted.

Having thus described the invention with reference to a preferred embodiment, what is claimed is:

1. A method for parallel processing of received bit streams in a telecommunication equipment including a Digital Signal Processing system (202) having associated RAM storage, said telecommunication equipment receiving bit streams transporting HDLC/SDLC frames, the method comprising the steps of:

generating at least one table providing a zero deletion and a character alignment function required in the HDLC/SDLC line control protocols, receiving an incoming bit stream and assembling samples of n consecutive bits therefrom to be processed in parallel, using said assembled n consecutive bits as addressing elements for accessing said at least one table in order to derive a character corresponding to data to be extracted from the HDLC frame, wherein said generating step includes the steps of:

building a first table (45) providing the zero deletion function and which is accessed by means of an address comprising a first address (R-spl) containing the said n consecutive bits to be processed in parallel, a second address field (R-one-ctr) containing the current number of consecutive '1' bits received in said consecutive bits, said first table providing a word comprising a first read field giving a new value (NEW-R-one-ctr) to be used for a next access to the table, a second read field (FAI)representative of the HDLC Flag, Idle and Abort signals, and a third read field (R-data) representative of the residual data bits contained in a last processed sample, building a second table (CHAR-SYNCHRO 48) providing the character alignment function which is accessed by means of an address comprising a first address field (R-data) containing said residual data bits, a second address field (R-bit-ctr) containing the number of bits which are assembled in a current character, said second table providing a word comprising a first read field giving the new value (NEW-R-one-ctr) of said address field which is to be used for the next access to said second table, a second read field (DATA-SEGMENT) containing the significant portion of said residual data input (R-data) which is correctly positioned according to the value of said second address field of said second table (CHAR-SYNCHRO 48), a third read field which is used at the completion of the assembling process of one character in order to take into account the bits which were contained in the last processed sample and which corresponds to a next character, said method further including the step of performing successive logical OR operations of said second read field (DATA-SEGMENT) in order to progressively elaborate the character being extracted from said HDLC/SDLC bit stream, and storing said elaborated character within the RAM storage.

2. A method for parallel processing of bit streams for transmission in a telecommunication equipment including a Digital Signal Processing system (202) having associated RAM storage, said telecommunication equipment transmitting bit streams transporting HDLC/SDLC frames, the method comprising the steps of:

generating at least one table (5,45,48) providing a zero insert and a character alignment function required in the HDLC/SDLC line control features, extracting the characters to transmit to the HDLC line and assembling n consecutive bits therefrom to be processed in parallel, using said assembled n consecutive bits as addressing elements for accessing said at least one table in order to derive the character corresponding to the HDLC bit stream to be transmitted, wherein said generating step includes the steps of:

building a first table (42) providing the zero-insert function which is accessed by means of an address comprising a first address field (T-spl) containing the said n consecutive bits to be processed in parallel, a second address field (T-one-ctr) containing the current number of consecutive '1' bits received in said consecutive bits, said first table providing a word comprising a first read field giving a new value (NEW-T-one-ctr) to be used for a next access to the table, a second read field representative of the residual data bits (T-data) contained in a last processed sample, building a second table (CHAR-SYNCHRO 48) providing the character alignment function which is accessed by means of an address comprising a first address field (T-data) containing said residual data bits, a second address field (T-bit-ctr) containing the number of bits which are assembled in a current character, said second table providing a word comprising a first read field giving the new value (NEW-T-one-ctr) of said second address field which is to be used for the next access to said second table, a second read field (DATA-SEGMENT) containing the significant portion of said residual data input (T-data) which is currently positioned according to the value of said second address field of said second table (CHAR-SYNCHRO 48), a third read field which is used at the completion of the assembling process of one character in order to take into account the bits which were contained in the last processed sample and which corresponds to a next character, said method further including the step of performing successive logical OR operations of said second read field (DATA-SEGMENT) in order to progressively elaborate the character being extracted from said HDLC/SDLC bit stream, and storing said elaborated character within the RAM storage.

3. The method for parallel processing according to claim 1 or 2 wherein:

said at least one table is stored in a PROM or ROM storage within the telecommunications equipment and that the method includes the step of transferring said table into a RAM storage during an initialization period occurring after the power-on of the telecommunication equipment.

4. The method for parallel processing according to claim 3 wherein:

said at least one table is generated by a software program stored in a PROM storage and that said generating step, further includes the steps of transferring said software program into the RAM storage associated with said DSP (202), generating and storing said at least one table into the RAM storage of said DSP by means of said software program, erasing said software program from said RAM storage.

5. The method for parallel processing according to claims 1 or 2 wherein:

said first and second tables are multiplexed in order to provide multiplexed HDLC lines.

* * * * *